US008737603B2

(12) United States Patent
Shirai et al.

(10) Patent No.: US 8,737,603 B2
(45) Date of Patent: May 27, 2014

(54) CRYPTOGRAPHIC PROCESSING APPARATUS, CRYPTOGRAPHIC PROCESSING METHOD, AND COMPUTER PROGRAM

(75) Inventors: Taizo Shirai, Kanagawa (JP); Kyoji Shibutani, Kanagawa (JP); Toru Akishita, Tokyo (JP); Shiho Moriai, Kanagawa (JP)

(73) Assignee: Sony Corporation, Tokyo (JP)

( * ) Notice: Subject to any disclaimer, the term of this patent is extended or adjusted under 35 U.S.C. 154(b) by 620 days.

(21) Appl. No.: 12/518,510

(22) PCT Filed: Nov. 21, 2007

(86) PCT No.: PCT/JP2007/072551
§ 371 (c)(1),
(2), (4) Date: Jun. 10, 2009

(87) PCT Pub. No.: WO2008/072455
PCT Pub. Date: Jun. 19, 2008

(65) Prior Publication Data
US 2010/0014664 A1    Jan. 21, 2010

(30) Foreign Application Priority Data
Dec. 11, 2006  (JP) ............... P2006-333882

(51) Int. Cl.
*G06F 21/00* (2013.01)
(52) U.S. Cl.
USPC .................. 380/28; 380/29; 380/44
(58) Field of Classification Search
USPC ................................... 380/28, 29
See application file for complete search history.

(56) References Cited

U.S. PATENT DOCUMENTS 6,578,061 B1 *  6/2003  Aoki et al. ............. 708/520
7,237,097 B2 *  6/2007  Kissell et al. ............ 712/223
(Continued)

FOREIGN PATENT DOCUMENTS

| JP | 01-147585 | 6/1989 |
| JP | 2003-345244 | 12/2003 |
| JP | 2006-115219 | 4/2006 |
| WO | WO 01/67425 A1 | 9/2001 |

OTHER PUBLICATIONS

K. Nyberg, "Generalized Feistel networks", ASIACRYPT'96, SpringerVerlag, 1996, pp. 91-104.

(Continued)

*Primary Examiner* — Jung Kim
*Assistant Examiner* — Ghodrat Jamshidi
(74) *Attorney, Agent, or Firm* — Finnegan Henderson Farabow Garrett & Dunner LLP

(57) ABSTRACT

To realize a common-key block cipher process configuration with increased difficulty of key analysis and improved security. In a configuration for storing in a register an intermediate key generated by using a secret key transformation process and performing a transformation process on the register-stored data to generate a round key, a process of swapping (permuting) data segments constituting the register-stored data is executed to generate a round key. For example, four data segments are produced so that two sets of data segments having an equal number of bits are set, and a process of swapping the individual data segments is repeatedly executed to generate a plurality of different round keys. With this configuration, the bit array of each round key can be effectively permuted, and round keys with low relevance can be generated. A high-security cryptographic process with increased difficulty of key analysis can be realized.

15 Claims, 27 Drawing Sheets

(56) References Cited

U.S. PATENT DOCUMENTS

| | | | |
|---|---|---|---|
| 7,317,795 B2 * | 1/2008 | She et al. | 380/37 |
| 7,639,800 B2 * | 12/2009 | Kasuya et al. | 380/37 |
| 7,702,100 B2 * | 4/2010 | Han et al. | 380/28 |
| 2005/0226407 A1 | 10/2005 | Kasuya et al. | |
| 2009/0103716 A1 * | 4/2009 | Shirai | 380/28 |

OTHER PUBLICATIONS

Yuliang Zheng, Tsutomu Matsumoto, Hideki Imai: On the Construction of Block Ciphers Provably Secure and Not Relying on Any Unproved Hypotheses. CRYPTO 1989: 461-480.
Introductory encryption theory.
Notification of Reasons for Refusal in Japanese Patent Application No. 2006-333882 with English translation (8 pgs.).
Carter, G. et al., Key Schedules of Iterative Block Ciphers, Lecture Notes in Computer Science, 1998, vol. 1438, pp. 80-89.
May, L. et al., Strengthening the Key Schedule of the AES, Lecture Notes in Computer Science, 2002, vol. 2384, pp. 226-240.
Office Action in counterpart Korean Application No. 10-2009-7011387, dated Feb. 17, 2014, with an English translation (7 pages).
Office Action in counterpart European Application No. 07832281.5, dated Feb. 27, 2014 (8 pages).
Jovan Golić, DeKaRT: A New Paradigm for Key-Dependent Reversible Circuits; C.D. Walter et al., CHES 2003, LNS 2779, 20-3; pp. 98-112.

\* cited by examiner

CRYPTOGRAPHIC PROCESSING APPARATUS, CRYPTOGRAPHIC PROCESSING METHOD, AND COMPUTER PROGRAM

TECHNICAL FIELD

The present invention relates to a cryptographic processing apparatus, a cryptographic processing method, and a computer program. More specifically, the present invention relates to a cryptographic processing apparatus, a cryptographic processing method, and a computer program for executing a common-key block cipher process.

BACKGROUND ART

For example, in network communications, electronic transactions, and other data processing fields, ensuring security is a critical issue. Cryptography technology is a method for ensuring security, and cryptographic processes are used in various fields.

Systems in which a cryptographic processing module is embedded in a compact device such as, for example, an IC card so that data is sent and received between the IC card and a reader/writer serving as a data read/write device to perform an authentication process or encryption and decryption of data to be sent and data received have been put into practical use.

There are various cryptographic processing algorithms. The algorithms are roughly classified into public-key cryptography in which encryption and decryption keys are set as different keys, for example, a public key and a secret key, and common-key cryptography in which both an encryption key and a decryption key are set as a common key.

There are various algorithms in the common-key cryptography. One of the algorithms is a method in which a plurality of keys are generated based on a common key and a data transformation process is repeatedly executed in units of blocks (64 bits, 128, 256 bits, and the like) using the plurality of generated keys. A typical algorithm with such a key generation method and data transformation process applied is common-key block cipher cryptography.

As typical common-key block cipher algorithms, the DES (Data Encryption Standard) algorithm, which was then the U.S. standard cryptography, and the AES (Advanced Encryption Standard) algorithm, which is now the U.S. standard, have been known.

Such common-key block cipher algorithms are mainly constituted by a cryptographic processing part having round-function executing parts for repeatedly executing transformation of input data, and a key scheduling part for generating round keys applied in individual rounds of the round-function parts. The key scheduling part first generates an expanded key with an increased number of bits on the basis of a master key (primary key) serving as a secret key, and generates a round key (sub-key) to be applied in each round-function part of the cryptographic processing part on the basis of the generated expanded key.

As a specific structure for executing such algorithms, a structure having linear transformation parts and non-linear transformation parts for repeatedly executing round functions has been known. For example, a typical structure is a Feistel structure. The Feistel structure is a structure for transforming plaintext into ciphertext by using simple iterations of a round function (F-function) serving as a data transformation function. In a round function (F-function), a linear transformation process and a non-linear transformation process are executed.

Note that, for example, Non-Patent Documents 1 and 2 are documents which describe cryptographic processes in which the Feistel structure is applied.

However, a problem with such a common-key block cipher process is key leakage due to cryptanalysis. The problem of being easy to break keys by cryptanalysis leads to low security of the cryptographic process, and is serious in practice.

Non-Patent Document 1: K. Nyberg, "Generalized Feistel networks", ASIACRYPT'96, SpringerVerlag, 1996, pp. 91-104.

Non-Patent Document 2: Yuliang Zheng, Tsutomu Matsumoto, Hideki Imai: On the Construction of Block Ciphers Provably Secure and Not Relying on Any Unproved Hypotheses. CRYPTO 1989: 461-480

DISCLOSURE OF INVENTION

Technical Problem

The present invention has been made in view of the foregoing problems, and it is an object of the present invention to provide a cryptographic processing apparatus, a cryptographic processing method, and a computer program for realizing a high-security common-key block cipher algorithm with increased difficulty of cryptanalysis.

Technical Solution

A first aspect of the present invention provides a cryptographic processing apparatus for executing a common-key block cipher process, characterized by including:

a cryptographic processing part for performing a data transformation process of repeating a round function for a plurality of rounds; and a key scheduling part for generating a round key to be applied in execution of the round function, wherein the key scheduling part is configured to include a register for generating an intermediate key by using a secret key transformation process and storing the generated intermediate key, and a data transformation part for executing the data transformation process on register-stored data that is stored in the register, the data transformation part repeatedly executing a process of swapping (permuting) data segments constituting the register-stored data to generate a plurality of different round keys.

Further, an embodiment of the cryptographic processing apparatus of the present invention is characterized in that the data transformation part is configured to divide the register-stored data into four data segments so that two sets of data segments having an equal number of bits are set, and repeatedly execute a process of swapping (permuting) the individual data segments to generate a plurality of different round keys.

Further, an embodiment of the cryptographic processing apparatus of the present invention is characterized in that the data transformation part is configured to divide the register-stored data, the register-stored data being composed of 2m bits, into four data segments which are indicated by (a) to (d):

(a) a data segment $A_0$ having a top i bit, (b) a data segment $A_1$ having bits in a range from an (i+1)-th bit from the top to an m-th bit, (c) a data segment $A_2$ having bits in a range from an (m+1)-th bit from the top to a (2m−i)-th bit, and (d) a data segment $A_3$ having a last i bit, and repeatedly execute a process of swapping (permuting) the individual data segments to generate a plurality of different round keys.

Further, an embodiment of the cryptographic processing apparatus of the present invention is characterized in that the data transformation part includes a double-swap process executing part for dividing the register-stored data into four data segments so that two sets of data segments having an equal number of bits are set, and executing a process of swapping (permuting) data segments in each set, and a double-swap inverse process executing part for executing a data transformation process corresponding to an inverse process of a plurality of iteration processes of the process of the double-swap executing part.

Further, an embodiment of the cryptographic processing apparatus of the present invention is characterized in that the data transformation part has a configuration for performing a decryption round-key generation process for generating the round keys in an order opposite to that of the generation of the round keys in an encryption process, and includes a decryption round-key-correspondence-data transformation part for generating result data by using a transformation process for the register-stored data, the result data being obtained as a result of repeating a double-swap process a number of times that is determined based on a predefined number of rounds, the double-swap process including dividing the register-stored data into four data segments so that two sets of data segments having an equal number of bits are set and executing a process of swapping (permuting) data segments in each set, and a double-swap inverse process executing part for executing an inverse process of the double-swap process on data transformed in the decryption round-key-correspondence-data transformation part to generate a round key for each round.

Further, an embodiment of the cryptographic processing apparatus of the present invention is characterized in that the data transformation part includes a swap process executing part for dividing the register-stored data, the register-stored data being composed of 2m bits, into two data segments which are indicated by (a) and (b):

(a) a data segment $A_0$ having top m bits, and (b) a data segment $A_1$ having last m bits, and executing a process of swapping (permuting) the individual data segments, and a sub-swap process executing part for dividing the register-stored data, the register-stored data being composed of 2m bits, into three data segments which are indicated by (c) to (e):

(c) a data segment $A_0$ having top (m−i) bits, (d) a data segment $A_1$ having bits in a range from an (m−i+1)-th bit from the top to an (m+i)-th bit, and (e) a data segment $A_2$ having bits in a range from an (m+i+1)-th bit from the top to an end bit, and executing a process of swapping (permuting) the data segments given in (c) and (d), and the data transformation part is configured to alternately execute the processes of the swap process executing part and the sub-swap process executing part in accordance with a progress of rounds to execute generation of round keys.

Further, an embodiment of the cryptographic processing apparatus of the present invention is characterized in that the data transformation part further includes an inverse transformation process executing part for executing a data transformation corresponding to an inverse process of iteration processes of the processes of the swap process executing part and the sub-swap process executing part.

Further, an embodiment of the cryptographic processing apparatus of the present invention is characterized in that the key scheduling part is configured to further include a constant generation part for generating a constant which is different for each round, and an exclusive-OR operation part for executing an exclusive-OR operation between the constant generated by the constant generation part and the register-stored data to generate a round key.

Further, an embodiment of the cryptographic processing apparatus of the present invention is characterized in that the constant generation part is configured to generate a constant which is different for each round by using a combination of shifted data items of small-number-of-bits data which has a smaller number of bits than a constant to be generated and which is different for each round.

Further, an embodiment of the cryptographic processing apparatus of the present invention is characterized in that the constant generation part is configured to generate small-number-of-bits data which is different for each round by performing a data transformation on small-number-of-bits data having a smaller number of bits than a constant to be generated, and generate a constant which is different for each round by using a combination of shifted data items of the generated small-number-of-bits data.

Further, a second aspect of the present invention provides a cryptographic processing method for executing a common-key block cipher process using a cryptographic processing apparatus, characterized by comprising:

a round key generating step of, in a key scheduling part, generating a plurality of round keys to be applied in execution of round functions for a plurality of rounds that are executed in a cryptographic processing unit; and a cryptographic processing step of, in the cryptographic processing part, performing a data transformation process of repeating for the plurality of rounds the round functions in which the round keys are applied, wherein the round key generating step is a step including an intermediate-key generating step of generating an intermediate key by using a secret key transformation process and storing the generated intermediate key in a register, and a data transformation step in which a data transformation part repeatedly executes a process of swapping (permuting) data segments constituting register-stored data that is stored in the register to generate a plurality of different round keys.

Further, an embodiment of the cryptographic processing method of the present invention is characterized in that the data transformation step is a step of dividing the register-stored data into four data segments so that two sets of data segments having an equal number of bits are set, and repeatedly executing a process of swapping (permuting) the individual data segments to generate a plurality of different round keys.

Further, an embodiment of the cryptographic processing method of the present invention is characterized in that the data transformation step is a step of dividing the register-stored data, the register-stored data being composed of 2m bits, into four data segments which are indicated by (a) to (d):

(a) a data segment $A_0$ having a top i bit, (b) a data segment $A_1$ having bits in a range from an (i+1)-th bit from the top to an m-th bit, (c) a data segment $A_2$ having bits in a range from an (m+1)-th bit from the top to a (2m−i)-th bit, and (d) a data segment $A_3$ having a last i bit, and repeatedly executing a process of swapping (permuting) the individual data segments to generate a plurality of different round keys.

Further, an embodiment of the cryptographic processing method of the present invention is characterized in that the data transformation step is a step including a double-swap process executing step of dividing the register-stored data into four data segments so that two sets of data segments having an equal number of bits are set, and executing a process of swapping (permuting) data segments in each set, and a double-swap inverse process executing step of executing a data transformation process corresponding to an inverse process of a plurality of iteration processes of the process of the double-swap executing step.

Further, an embodiment of the cryptographic processing method of the present invention is characterized in that the data transformation step includes a step of performing a decryption round-key generation process for generating the round keys in an order opposite to that of the generation of the round keys in an encryption process, and is a step including a decryption round-key-correspondence-data transformation step of generating result data by using a transformation process for the register-stored data, the result data being obtained as a result of repeating a double-swap process a number of times that is determined based on a predefined number of rounds, the double-swap process including dividing the register-stored data into four data segments so that two sets of data segments having an equal number of bits are set and executing a process of swapping (permuting) data segments in each set, and a double-swap inverse process executing step of executing an inverse process of the double-swap process on data transformed in the decryption round-key-correspondence-data transformation step to generate a round key for each round.

Further, an embodiment of the cryptographic processing method of the present invention is characterized in that the data transformation step step includes a swap process executing step of dividing the register-stored data, the register-stored data being composed of 2m bits, into two data segments which are indicated by (a) and (b):
  (a) a data segment $A_0$ having top m bits, and
  (b) a data segment $A_1$ having last m bits, and
  executing a process of swapping (permuting) the individual data segments, and
  a sub-swap process executing step of dividing the register-stored data, the register-stored data being composed of 2m bits, into three data segments which are indicated by (c) to (e):
  (c) a data segment $A_0$ having top (m−i) bits,
  (d) a data segment $A_1$ having bits in a range from an (m−i+1)-th bit from the top to an (m+i)-th bit, and
  (e) a data segment $A_2$ having bits in a range from an (m+i+1)-th bit from the top to an end bit, and executing a process of swapping (permuting) the data segments given in (c) and (d), and
  the data transformation step is a step of alternately executing the processes of the swap process executing step and the sub-swap process executing step in accordance with a progress of rounds to execute generation of round keys.

Further, an embodiment of the cryptographic processing method of the present invention is characterized in that the data transformation step further includes an inverse transformation process executing step of executing a data transformation corresponding to an inverse process of iteration processes of the processes of the swap process executing step and the sub-swap process executing step.

Further, an embodiment of the cryptographic processing method of the present invention is characterized in that the cryptographic processing method further includes a constant generation step in which a constant generation part generates a constant which is different for each round, and an exclusive-OR operation step in which an exclusive-OR operation part executes an exclusive-OR operation between the constant generated by the constant generation part and the register-stored data to generate a round key.

Further, an embodiment of the cryptographic processing method of the present invention is characterized in that the constant generation step is a step of generating a constant which is different for each round by using a combination of shifted data items of small-number-of-bits data which has a smaller number of bits than a constant to be generated and which is different for each round.

Further, an embodiment of the cryptographic processing method of the present invention is characterized in that the constant generation step is a step of generating small-number-of-bits data which is different for each round by performing a data transformation on small-number-of-bits data having a smaller number of bits than a constant to be generated, and generating a constant which is different for each round by using a combination of shifted data items of the generated small-number-of-bits data.

Further, a third aspect of the present invention provides
a computer program for causing a cryptographic processing apparatus to execute a common-key block cipher process, characterized by comprising:
  a round key generating step of causing a key scheduling part to generate a plurality of round keys to be applied in execution of round functions for a plurality of rounds that are executed in a cryptographic processing unit; and
  a cryptographic processing step of causing the cryptographic processing part to perform a data transformation process of repeating for the plurality of rounds the round functions in which the round keys are applied,
  wherein the round key generating step is a step of causing execution of
  an intermediate-key generating step of generating an intermediate key by using a secret key transformation process and storing the generated intermediate key in a register, and
  a data transformation step in which a data transformation part causes repeated execution of a process of swapping (permuting) data segments constituting register-stored data that is stored in the register to generate a plurality of different round keys.

Note that the computer program of the present invention is a computer program that can be provided in a computer-readable format to, for example, a computer system capable of executing various types of program code through a storage medium or communication medium, for example, a recording medium such as a CD, an FD, or an MO, or a communication medium such as a network. The program is provided in computer-readable format. Accordingly, processing in accordance with the program is implemented on the computer system.

Further objects, features, or advantages of the present invention will become apparent from the following description of exemplary embodiments of the present invention or more detailed descriptions based on the accompanying drawings. Note that in this specification, the term system refers to a logical set configuration of apparatuses regardless of whether the individual constituent apparatuses are housed in the same housing.

Advantageous Effects

According to the configuration of an exemplary embodiment of the present invention, in a round-key generation process in a common-key block cipher process, an intermediate key generated by using a secret key transformation process is stored in a register, and a process of swapping (permuting) data segments constituting the register-stored data is repeatedly executed to generate round keys. For example, the register-stored data is divided into four data segments so that two sets of data segments having an equal number of bits are set, and a process of swapping (permuting) the individual data segments is repeatedly executed to generate a plurality of different round keys. With this configuration, the bit array of each round key can be effectively permuted, and round keys with low relevance can be generated. A high-security cryptographic process configuration with increased difficulty of key analysis can be realized.

BEST MODES FOR CARRYING OUT THE INVENTION

In the following, a cryptographic processing apparatus, a cryptographic processing method, and a computer program of the present invention will be explained in detail. Explanations will be given in accordance with the following items.

1. Overview of Common-Key Block Cipher
2. Round-Key Generation Process Configuration in Key Scheduling Part
    (2-1) With regard to Detailed Configuration of Key Scheduling Part
    (2-2) With regard to Typical Round-Key Generation Process Configuration with Shift Process Applied
    (2-3) With regard to Round-Key Generation Process Configuration according to First Exemplary Embodiment of Present Invention
    (2-4) With regard to Round-Key Generation Process Configuration according to Second Exemplary Embodiment of Present Invention
    (2-5) With regard to Round-Key Generation Process Configuration according to Third Exemplary Embodiment of Present Invention
3. Example Configuration of Cryptographic Processing Apparatus

[1. Overview of Common-Key Block Cipher]

First, an overview of a common-key block cipher to which the present invention can be applied will be explained. In this specification, it is assumed that the common-key block cipher (hereinafter, block cipher) refers to that defined as follows.

In the block cipher, plaintext P and a key K are input and ciphertext C is output. The bit length of plaintext and ciphertext is referred to as a block size which is represented herein by n, where n can be any integer value. In general, the value n is a single value that is determined in advance for each block cipher algorithm. A block cipher with a block length of n may also be referred to as an n-bit block cipher.

The bit length of a key is represented by k. The key can have any integer value. A common-key block cipher algorithm supports one or a plurality of key sizes. For example, a certain block cipher algorithm A may be configured to have block size n=128 and to support various key sizes such as key bit length k=128, k=192, or k=256.

Figure 1:
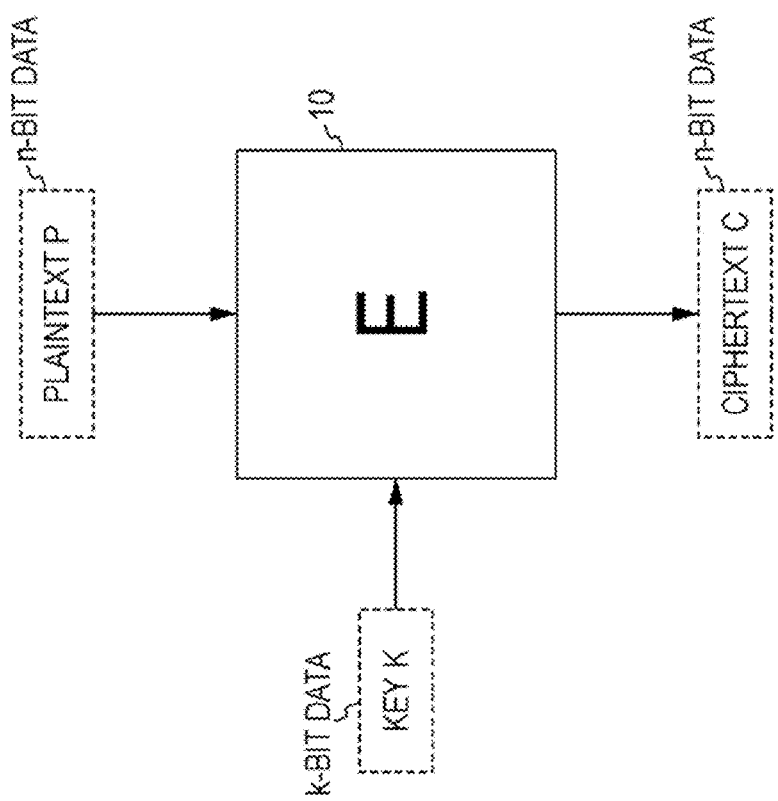
FIG. 1 is a diagram showing a basic configuration of a common-key block cipher algorithm.

The bit sizes of the plaintext [P], the ciphertext [C], and the key [K] are given as follows:
Plaintext P: n bits
Ciphertext C: n bits
Key K: k bits FIG. 1 shows an n-bit common-key block cipher algorithm E that supports a key length of k bits. As shown in FIG. 1, n-bit plaintext P and a k-bit key K are input to a common-key block cipher processing part E 10, and the common-key block cipher processing part E 10 executes a predetermined cryptographic algorithm and outputs n-bit ciphertext C. Note that FIG. 1 shows only an encryption process for generating ciphertext from plaintext. In a decryption process for generating plaintext from ciphertext, an inverse function of E 10 is generally used. However, depending on the structure of the encryption processing part E 10, a similar common-key block cipher processing part E 10 can also be applied in the decryption process. The decryption process can be performed by changing a sequence such as a key input order.

Figure 2:
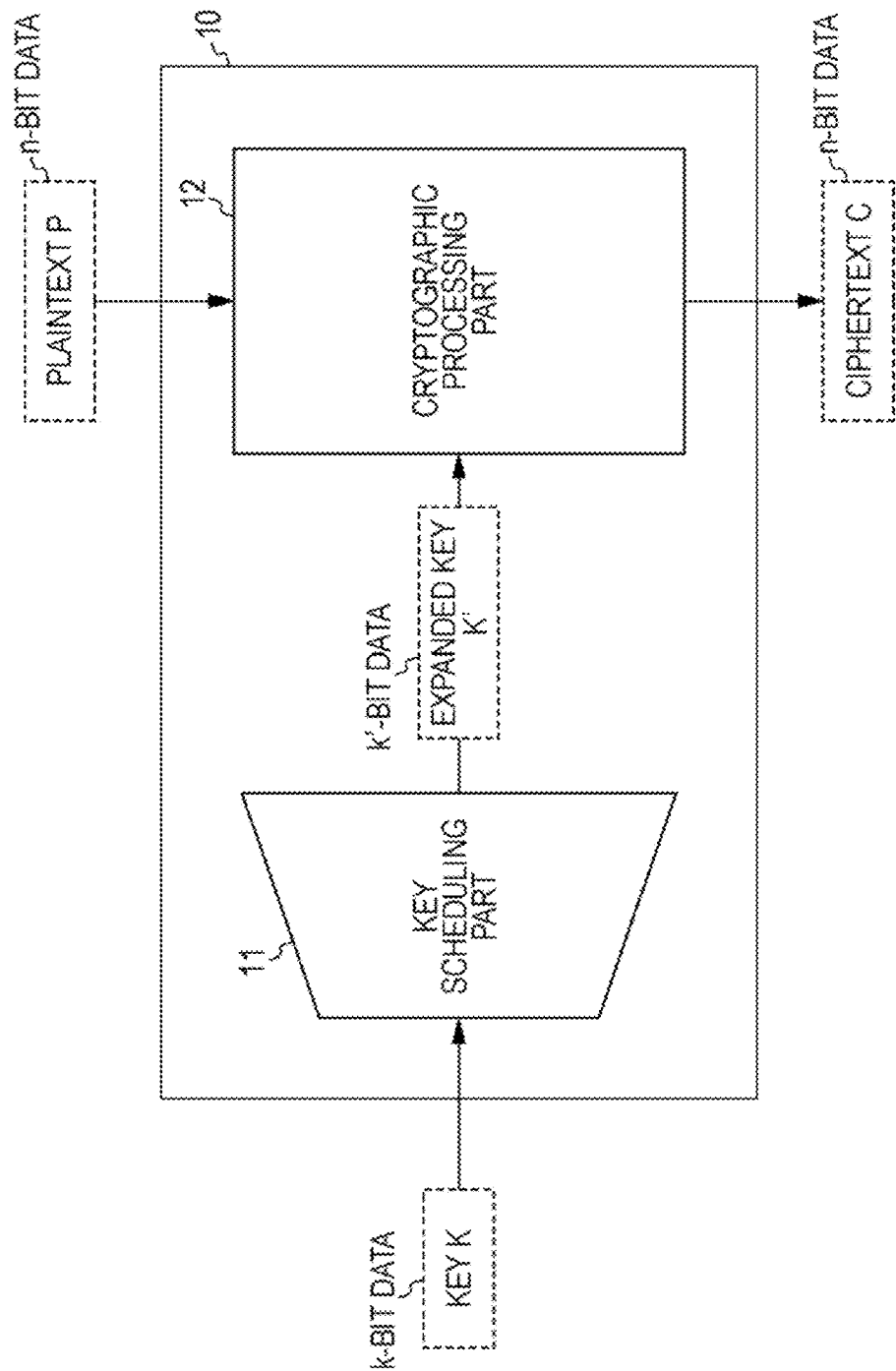
FIG. 2 is a diagram explaining an internal configuration of a common-key block cipher processing part E 10 shown in FIG. 1.

The internal configuration of the common-key block cipher processing part E 10 shown in FIG. 1 will be explained with reference to FIG. 2. A block cipher can be considered in the context of two separate parts, one of which is a key scheduling part 11 to which the key K is input and from which an expanded key K' (bit length k') obtained by expanding the bit length of the input key K by using a certain predetermined step is output; and a cryptographic processing part 12 that receives the plaintext P and the expanded key K' input from the key scheduling part 11 and that executes, upon the plaintext P being input, a cryptographic process with the expanded key K' to execute a data transformation for generating the ciphertext C. Note that, as explained earlier, depending on the structure of the cryptographic processing part 12, the cryptographic processing part 12 may also be applicable to a data decryption process for recovering plaintext from ciphertext.

Figure 3:
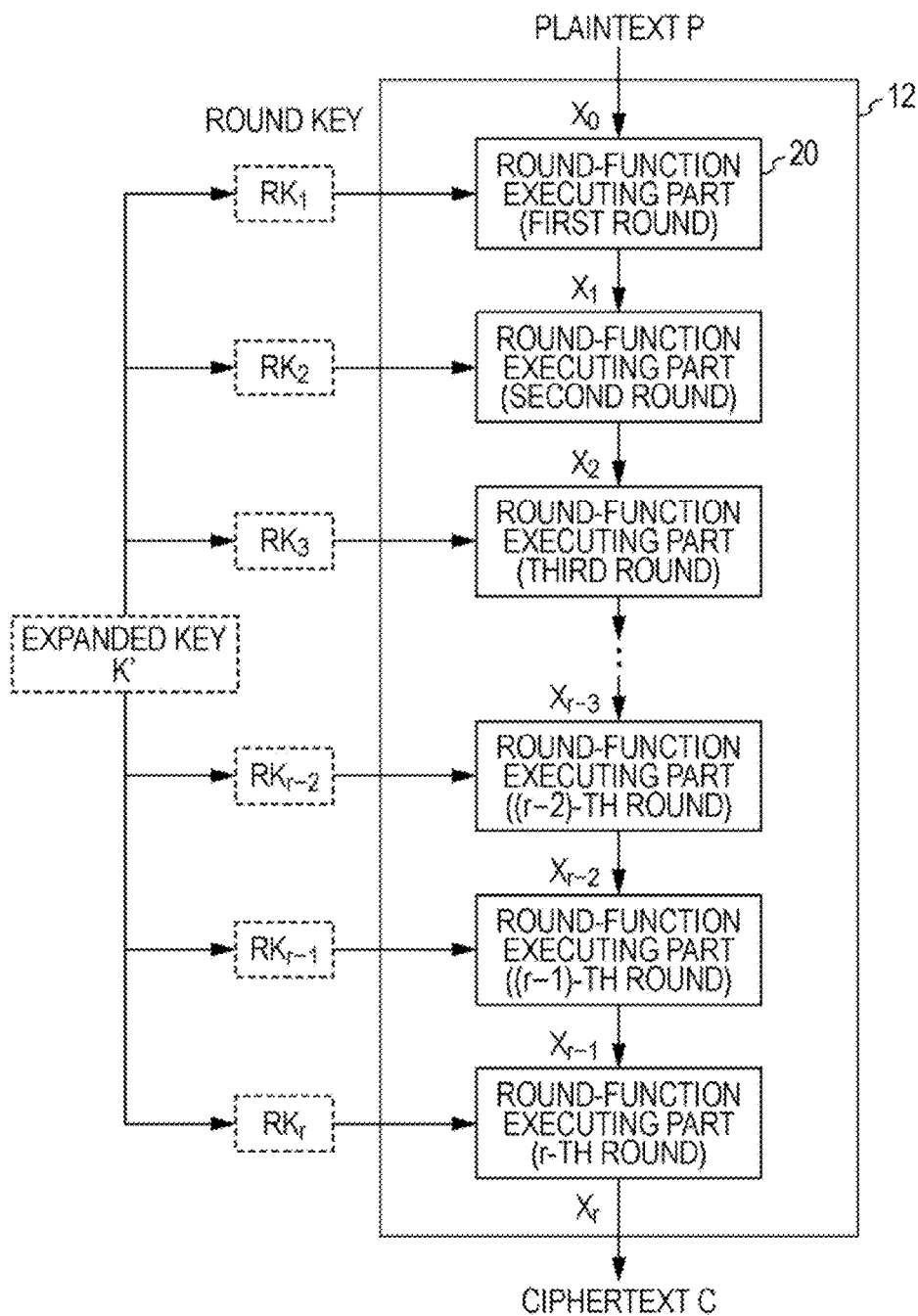
FIG. 3 is a diagram explaining a detailed configuration of a cryptographic processing part 12 shown in FIG. 2.

Next, the configuration of the cryptographic processing part 12 shown in FIG. 2 will be explained in detail with reference to FIG. 3. As shown in FIG. 3, the cryptographic processing part 12 has a configuration for repeatedly executing data transformations with round-function executing parts 20 applied. That is, the cryptographic processing part 12 can be divided into processing units called the round-function executing parts 20. Each of the round-function executing parts 20 receives two types of data as inputs, i.e., an output $X_i$ of the previous round-function executing part and a round key $RK_i$ generated based on the expanded key, and internally executes a data transformation process to output output data $X_{i+1}$ to the next round-function executing part. Note that in the first round, the input is plaintext or data obtained by performing an initialization process on plaintext. Further, the output in the final round is ciphertext.

In the example shown in FIG. 3, the cryptographic processing part 12 has r round-function executing parts 20, and is configured to repeat data transformations in the r round-function executing parts to generate ciphertext. The number of round function iterations is referred to as the number of rounds. In the example shown in the figure, the number of rounds is r.

Input data $X_i$ to each round-function executing part is n-bit data that is being encrypted. In a certain round, a round function output $X_{i-1}$ is supplied as the input for the next round. The other input data to each round-function executing part is implemented by data that is based on the expanded key K' output from the key scheduling. The key input to each round-function executing part and applied to the execution of the round function is referred to as a round key. In the figure, the round key applied in the i-th round is represented by $RK_i$. The expanded key K' is configured as, for example, concatenated data of the round keys $RK_1$ to $RK_r$ for r rounds.

The configuration shown in FIG. 3 is a configuration of the cryptographic processing part 12 in which, as viewed from the input side of the cryptographic processing part 12, input data for the first round is represented by $X_0$, and data output from the i-th round function and a round key are represented by $X_i$ and $RK_i$, respectively. Note that depending on the structure of the cryptographic processing part 12, for example, a configuration may be employed in which the applying sequence of round keys to be applied is set reversely to that in the encryption process in such a manner that plaintext is output by inputting ciphertext to the cryptographic processing part 12.

The round-function executing parts 20 of the cryptographic processing part 12 shown in FIG. 3 can take various forms. Round functions can be classified according to the structure which the corresponding cryptographic algorithms adopt. Typical structures are:
(a) SPN (Substitution Permutation Network) structure
(b) Feistel structure In the following, the specific configuration of the above structures will be explained with reference to FIGS. 4 to 6.

(a) SPN-Structure Round Function

Figure 4:
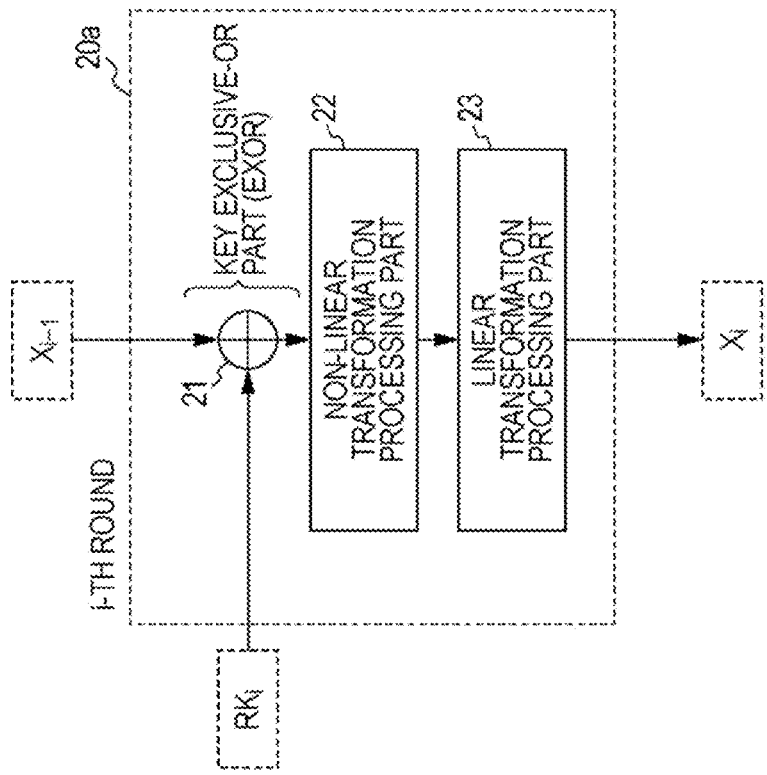
FIG. 4 is a diagram explaining an SPN-structure round function which is an example configuration of a round-function executing part.

First, an SPN-structure round function, which is an example configuration of the round-function executing parts 20, will be explained with reference to FIG. 4. An SPN-structure round-function executing part 20a has a so-called SP-type configuration in which a non-linear transformation layer (S-layer) and a linear transformation layer (P-layer) are connected. As shown in FIG. 4, the SPN round-function executing part 20a is constituted by an exclusive-OR operation part 21 for executing the exclusive-OR (EXOR) operation between all n bits of input data and a round key, a non-linear transformation processing part 22 to which the operation result of the exclusive-OR operation part 21 is input and that executes the non-linear transformation of the input data, a linear transformation processing part 23 to which the non-linear transformation process result obtained in the non-linear transformation processing part 22 is input and that executes a linear transformation process on the input data, and the like. The linear transformation process result of the linear transformation processing part 23 is output to the next round. In the final round, ciphertext is obtained. Note that in the example shown in FIG. 4, the processing order of the exclusive-OR operation part 21, the non-linear transformation processing part 22, and the linear transformation processing part 23 is shown. However, the order of those processing parts is not limited and a configuration may be employed in which the processes are performed using any other sequence.

(b) Feistel Structure

Figure 5:
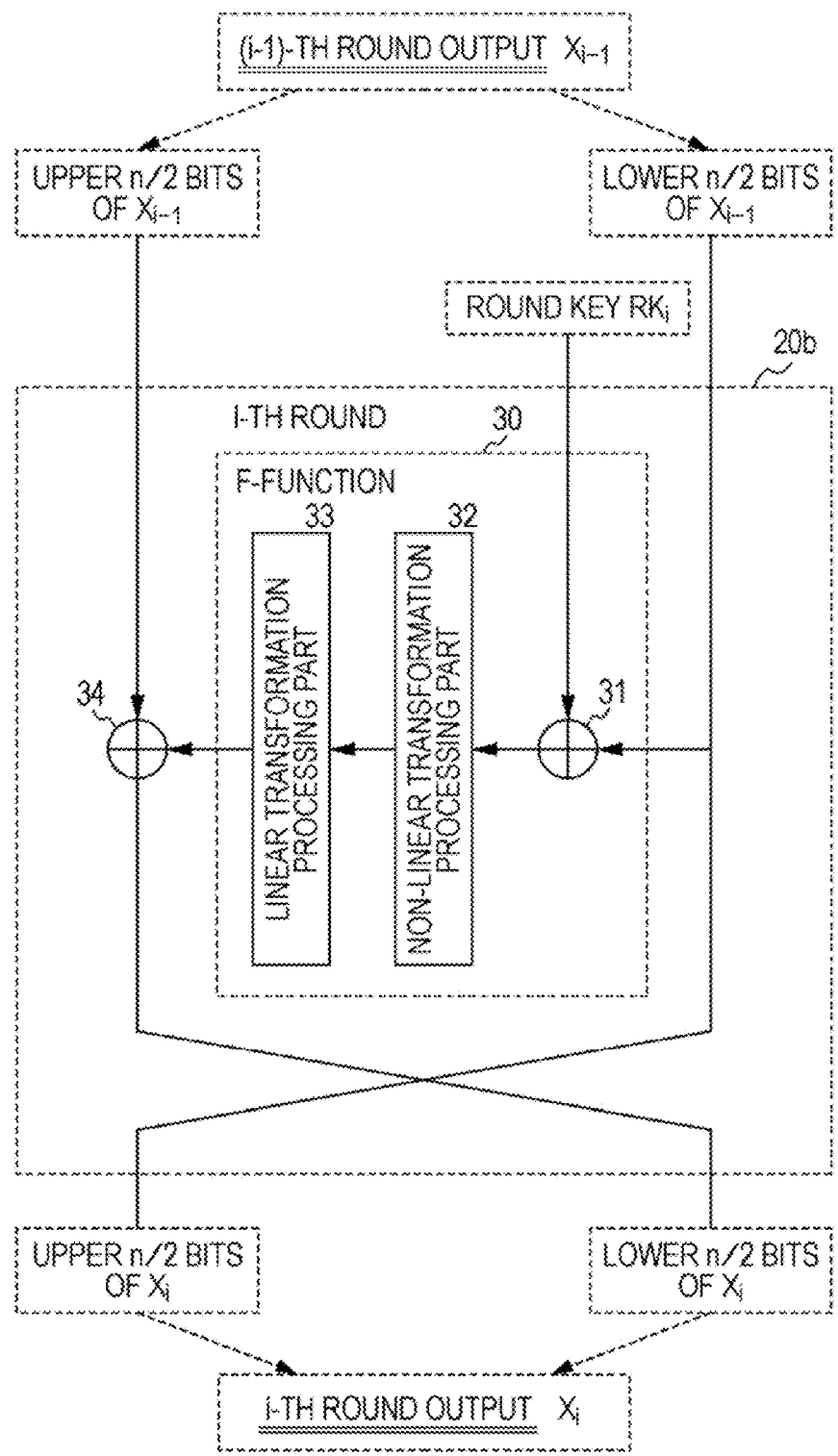
FIG. 5 is a diagram explaining a Feistel structure which is an example configuration of a round-function executing part.

Next, the Feistel structure, which is another example configuration of the round-function executing parts 20, will be explained with reference to FIG. 5. In the Feistel structure, as shown in FIG. 5, n-bit input data, which is the input from the previous round (in the first round, input text), is divided into two n/2-bit data segments which are permuted in individual rounds to execute processing.

In a process in which a round-function executing part 20b having the Feistel structure is applied, as shown in the figure, one n/2-bit data segment and a round key are input to an F-function part 30. As in the SPN structure described above, the F-function part 30 has a so-called SP-type configuration in which a non-linear transformation layer (S-layer) and a linear transformation layer (P-layer) are connected.

The n/2-bit data segment from the previous round and the round key are input to an exclusive-OR operation part 31 in the F-function part 30, and an exclusive-OR (EXOR) process is performed. The result data obtained thereby is further input to a non-linear transformation processing part 32 to execute a non-linear transformation. Further, the result of the non-linear transformation is input to a linear transformation processing part 33, and a linear transformation is executed. The result of the linear transformation is output as F-function processing result data.

Further, this F-function output and the other n/2-bit input that is input from the previous round are input to an exclusive-OR operation part 34 to execute an exclusive-OR operation (EXOR). The result of the execution is set as the F-function input for the next round. Note that in the figure, n/2 bits set as the F-function input for the i-th round are applied in the exclusive-OR operation with the F-function output for the next round. In this manner, in the Feistel structure, a data transformation process in which F-functions are applied with alternate permutation of inputs in individual rounds is executed.

As explained with reference to FIGS. 4 to 5, in a common-key block cipher, the round-function executing parts 20 in the cryptographic processing part 12 can have the following structures:

(a) SPN (Substitution Permutation Network) structure
(b) Feistel structure

Round-function executing parts having those structures have a so-called SP-type configuration in which a non-linear transformation layer (S-layer) and a linear transformation layer (P-layer) are connected. That is, such round-function executing parts have a non-linear transformation processing part for executing a non-linear transformation process, and a linear transformation processing part for executing a linear transformation process. In the following, the transformation process configurations thereof will be explained.

(Non-Linear Transformation Processing Part)

Figure 6:
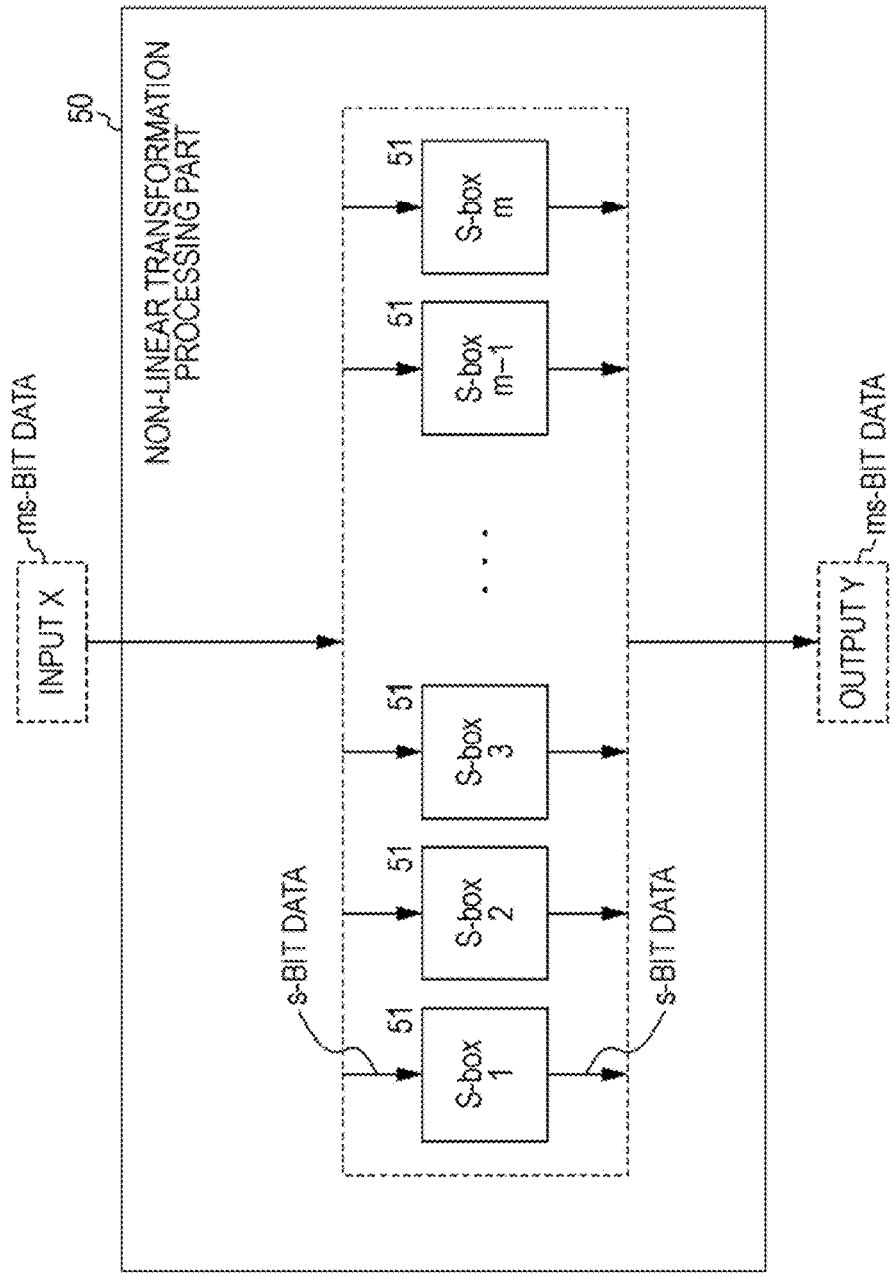
FIG. 6 is a diagram explaining a specific example of a non-linear transformation processing part.

A specific example of a non-linear transformation processing part will be explained with reference to FIG. 6. As shown in FIG. 6, specifically, a non-linear transformation processing part 50 is designed such that m non-linear transformation tables with s-bit input and s-bit output, which are referred to as S-boxes 51, are arranged, and ms-bit input data is divided into segments of s bits which are input to the corresponding S-boxes 51 and are transformed. In each of the S-boxes 51, for example, a non-linear transformation process in which a transformation table is applied is executed.

As the size of data to be input increases, the cost for implementations tends to increase. To avoid this, as shown in FIG. 6, a configuration is often adopted in which target data X to be processed is divided into a plurality of units each of which is subjected to non-linear transformation. For example, if the input size is set to ms bits, the input data is divided into m data segments each having s bits, and bits are input to each of the m S-boxes 51. For example, a non-linear transformation process in which a transformation table is applied is executed to combine the m s-bit outputs. Thus, an ms-bit non-linear transformation result is obtained.

(Linear Transformation Processing Part)

Figure 7:
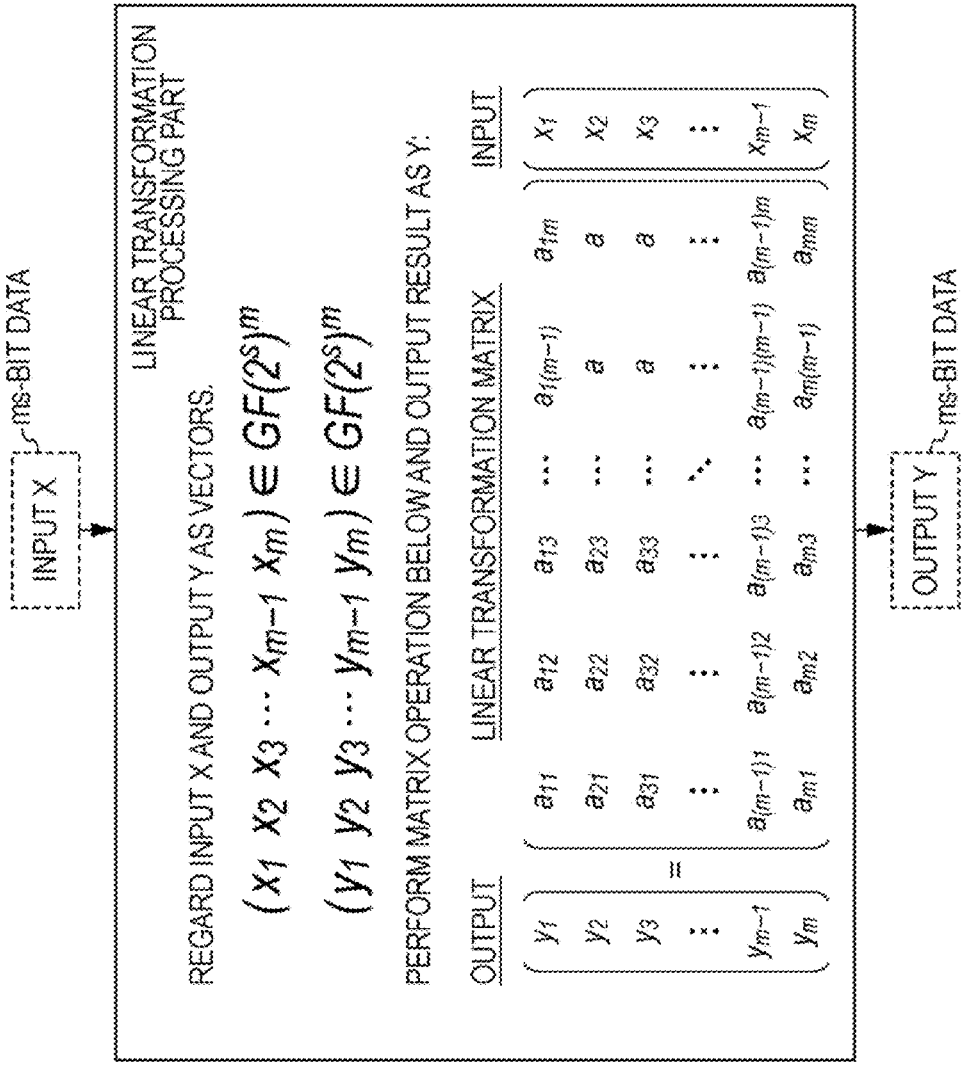
FIG. 7 is a diagram explaining a specific example of a linear transformation processing part.

A specific example of a linear transformation processing part will be explained with reference to FIG. 7. An input value, for example, an ms-bit output value, which is data output from an S-box, is input as an input value X to a linear transformation processing part. The linear transformation processing part subjects this input to linear transformation and outputs an ms-bit result. In the linear transformation process, for example, a linear transformation process such as a process of permuting the input bit positions is executed and an ms-bit output value Y is output. In the linear transformation process, for example, a linear transformation matrix is applied to the input to perform a process of permuting the input bit positions. An example of this matrix is a linear transformation matrix shown in FIG. 7.

In general, the elements of the linear transformation matrix applied in the linear transformation processing part can be configured as those of a matrix in which various expressions are applied, such as the elements of the field of extension field: $GF(2^8)$ or the elements of $GF(2)$. FIG. 7 shows one example configuration of a linear transformation processing part that is defined by an m×m matrix provided with ms-bit input and output and defined over $GF(2^s)$.

[2. Round-Key Generation Process Configuration in Key Scheduling Part]

As described above, a common-key block cipher is configured such that a cryptographic process is performed by using round function iterations. A problem with this common-key block cipher process is key leakage due to cryptanalysis. The problem of being easy to break keys by cryptanalysis leads to low security of this cryptographic process, and is serious in practice.

As is apparent from the explanation given above, in a common-key block cipher, processing in which round keys generated based on an expanded key are applied is performed in individual rounds. In cryptographic attacks, the attacks may be done in accordance with the procedure of recovering an expanded key on the basis of the analysis of round keys and further analyzing a secret key serving as original data of the expanded key. An example configuration of such an improved-security cryptographic processing apparatus with increased difficulty of key analysis will be explained hereinafter.

In the following, explanations will be given in accordance with the following items.

(2-1) With regard to Detailed Configuration of Key Scheduling Part
(2-2) With regard to Typical Round-Key Generation Process Configuration with Shift Process Applied
(2-3) With regard to Round-Key Generation Process Configuration according to First Exemplary Embodiment of Present Invention
(2-4) With regard to Round-Key Generation Process Configuration according to Second Exemplary Embodiment of Present Invention
(2-5) With regard to Round-Key Generation Process Configuration according to Third Exemplary Embodiment of Present Invention (2-1) With regard to Detailed Configuration of Key Scheduling Part As explained previously with reference to, for example, FIG. 2, in a common-key block cipher, a key scheduling part expands the bit length of an input key K, and outputs an expanded key K' (bit length k'). A round function in which a round key $RK_i$ generated based on the expanded key is applied is executed.

The key scheduling part expands key data having, for example, several hundreds of bits to expanded-key data having about several thousands of bits, and supplies the expanded-key data to a data encryption part for executing round functions. A portion of an expanded key that is input to a round function of the data encryption part is referred to as a round key. Besides round functions, round keys may be inserted. For example, a key that is inserted (EXORed) before the first round function is referred to as an initial key, and a key that is inserted (EXORed) after the last round function is referred to as a final key.

Figure 8:
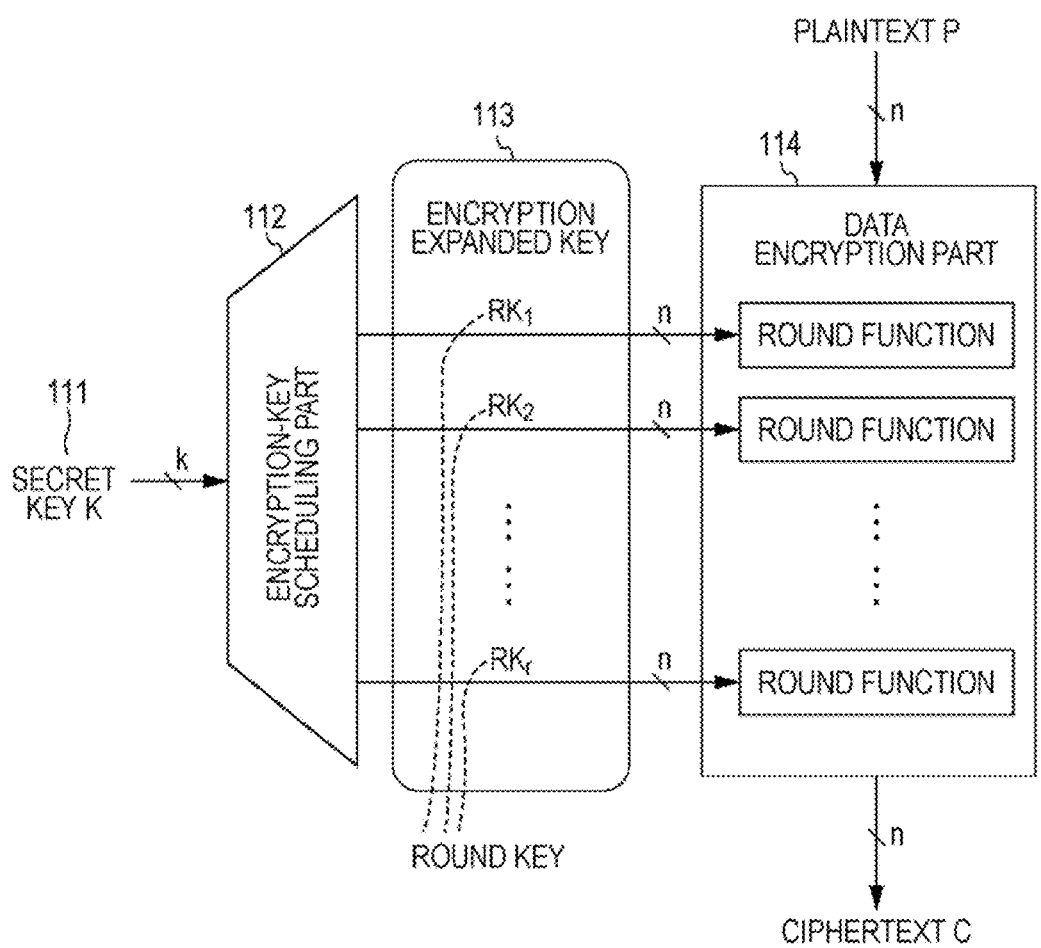
FIG. 8 is a diagram explaining the correspondence between a secret key K and an initial key, round keys, and a final key in the encryption process.
Figure 9:
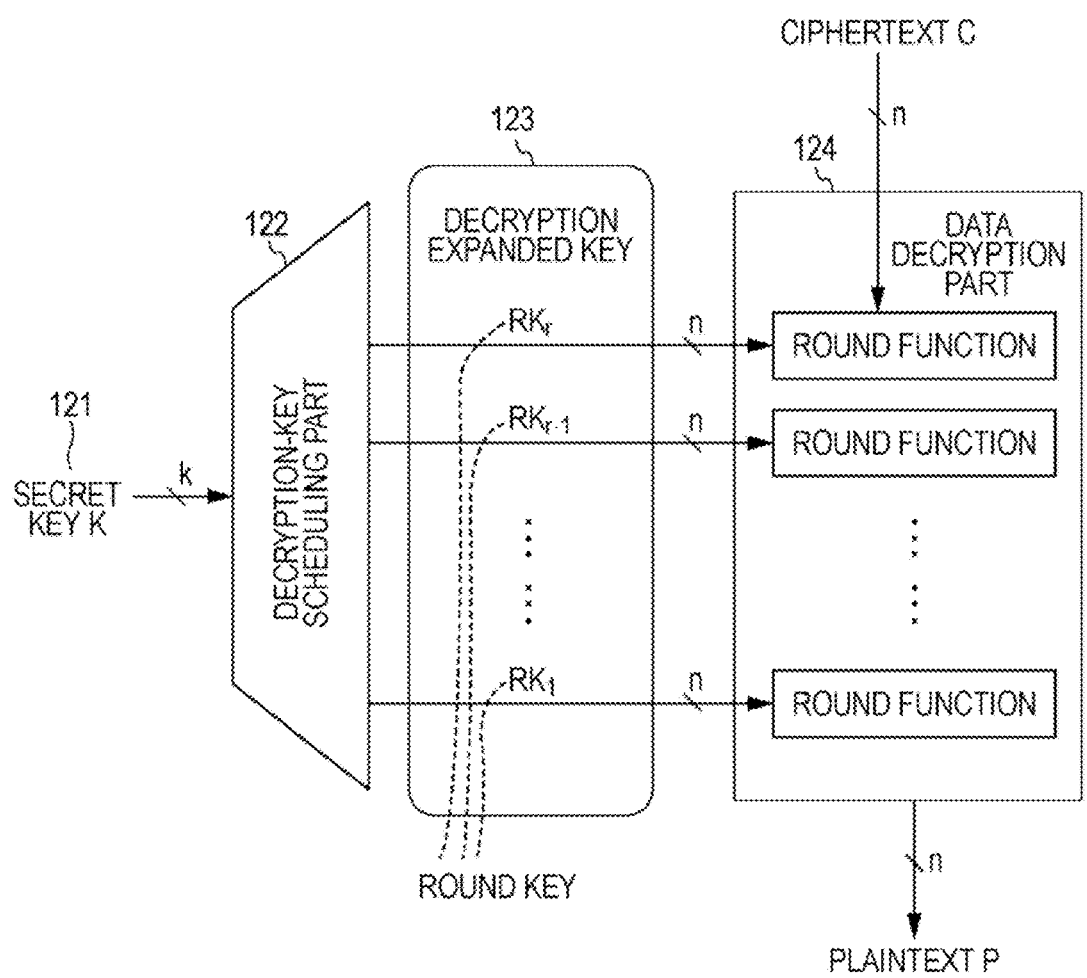
FIG. 9 is a diagram explaining the correspondence between a secret key K and an initial key, round keys, and a final key in the decryption process.

Correspondences between a secret key K and round keys in the encryption process and the decryption process will be explained with reference to FIGS. 8 and 9. FIGS. 8 and 9 show an encryption configuration and a decryption configuration, respectively, for executing a block cipher where the number of rounds is r.

For example, FIG. 8 shows an encryption configuration for executing a block cipher where the number of rounds is r. A secret key [K] 111 is input to an encryption-key scheduling part 112, and is subjected to data transformation according to a predetermined algorithm such as a bit extension process to generate an encryption expanded key 113 including a plurality of round keys. A data encryption part 114 is configured to execute a block cipher where the number of rounds is r. In the case of encryption, round keys $\{RK_1, RK_2, \ldots, RK_{r-1}, RK_r\}$ are input in turn to the first to r-th round functions, respectively, and round functions (F-functions) are executed.

FIG. 9 shows a decryption process configuration. A secret key [K] 121 is input to a decryption-key scheduling part 122, and is subjected to data transformation according to a predetermined algorithm such as a bit extension process to generate a decryption expanded key 123 including a plurality of round keys. Note that the same key as the secret key [K] 111 shown in FIG. 8, which has been applied in the encryption process, is applied to the secret key [K] 121.

A data decryption part 124 is configured to execute a block cipher where the number of rounds is r. In the case of the decryption process, round keys $\{RK_r, RK_{r-1}, \ldots, RK_2, RK_1\}$ are input in turn in the order opposite to that in the encryption process, and round functions (F-functions) are executed.

The ideal natures required for round keys in order to achieve a configuration with high resistance to cryptographic attacks based on key analysis, i.e., an improved-security configuration with difficult key analysis, are as follows:

(a) Incapability of recovering key data even if a round key is compromised (b) Independence between round keys The above characteristics exist.

The nature (a) means that, even in a case where a round key applied in each round is broken, the original secret key is not made recoverable from this round key, whereby security can be improved. Further, the nature (b) means that in a case where there is a certain relationship in data between one round key and another round key, a successful break of one round key enables estimation of another round key and such relevance is eliminated, whereby security can be improved.

However, in terms of the cost of implementations, it is difficult to generate round keys so that the round keys are independent from each other. In many actual cases, data segments extracted from data obtained by circularly shifting a secret key or intermediate-key data determined from the secret key using non-linear transformation are used as round keys. Further, even in a case where the foregoing conditions are not satisfied, in terms of security, it is necessary to have:

Sufficient resistance to slide attacks

Sufficient resistance to related cipher attacks

Slide attacks are attacks in which a pair of plaintext and ciphertext in which round functions where an original encryption function overlaps an encryption function obtained by shifting the original encryption function have the same data value is detected so that a key of a shifted portion can be efficiently determined using the detected pair. The attacks can be made in a case where round keys for several stages match with respect to different secret keys.

Further, related cipher attacks are attacks as follows: A case is considered where a certain common-key block cipher supports a key length of $k_1$ bits with the number of rounds $r_1$ and a key length of $k_2$ bits with the number of rounds $r_2$ (where it is assumed that $r_1 < r_2$ and $k_1 < k_2$). A case is considered where a round key having the key length of $k_1$ bits matches a portion of a round key having the key length of $k_2$ bits. In this case, the output of a data cryptography part in the case of the key length of $k_1$ bits can be used to attack the remaining round keys in the case of the key length of $k_2$ bits.

(2-2) With Regard to Typical Round-Key Generation Process Configuration with Shift Process Applied As described above, in a case where an apparatus for executing a common-key block cipher process using the round keys described above is configured, in terms of the cost of implementations, it is difficult to generate round keys so that the round keys are independent from each other. Actually, data segments extracted from data obtained by circularly shifting intermediate-key data determined from a secret key using non-linear transformation are used as round keys.

A typical example configuration of a key scheduling part in a case where data segments extracted from data obtained by circularly shifting this intermediate-key data determined from a secret key using non-linear transformation are used as round keys will be explained with reference to FIGS. 10 to 12.

Figure 10:
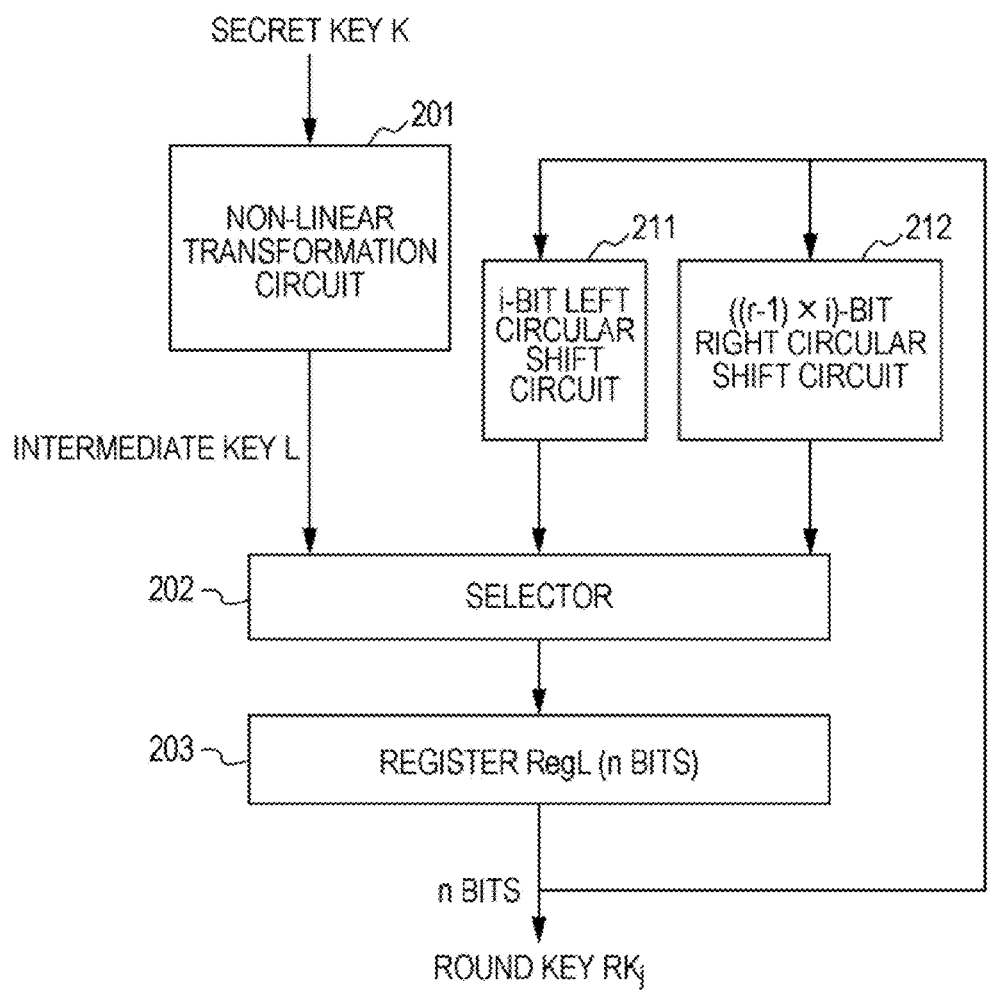
FIG. 10 is a diagram explaining an example configuration of a key scheduling part for executing a round-key generation process in the encryption process.
Figure 11:
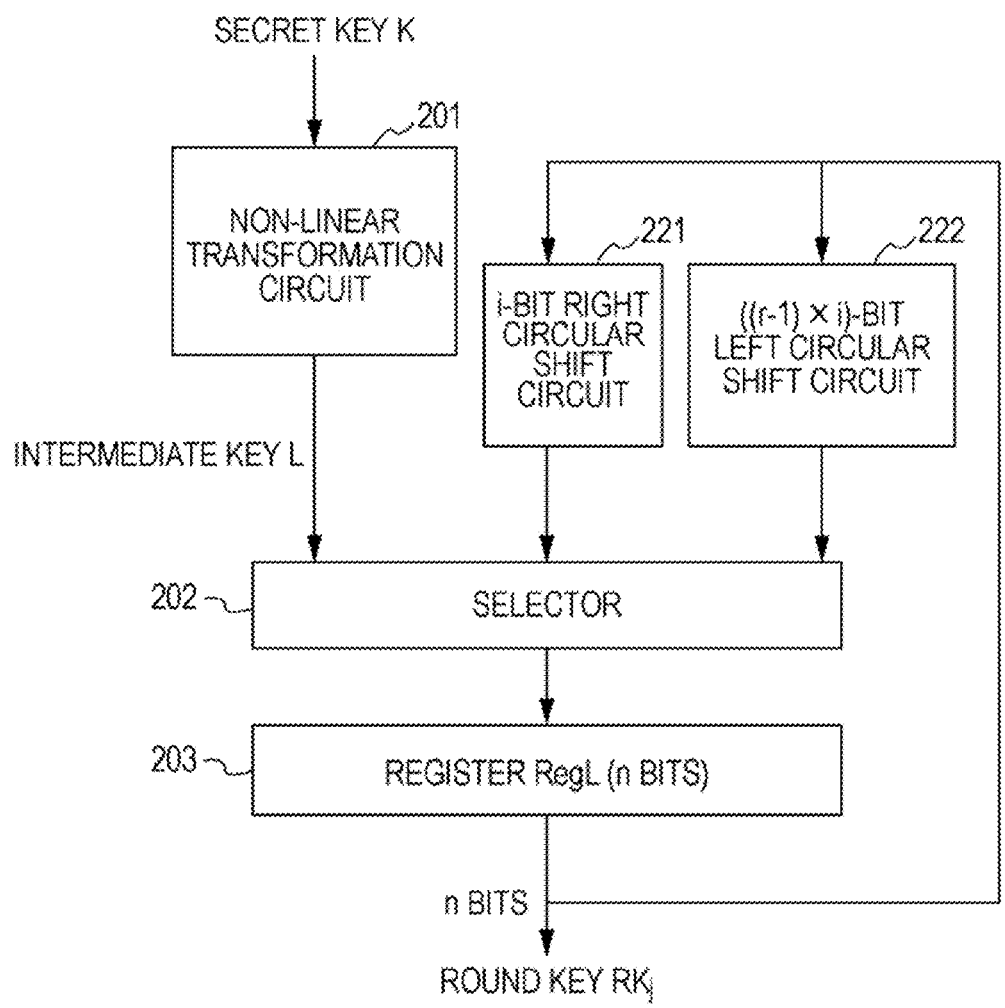
FIG. 11 is a diagram explaining an example configuration of a key scheduling part for executing a round-key generation process in the decryption process.
Figure 12:
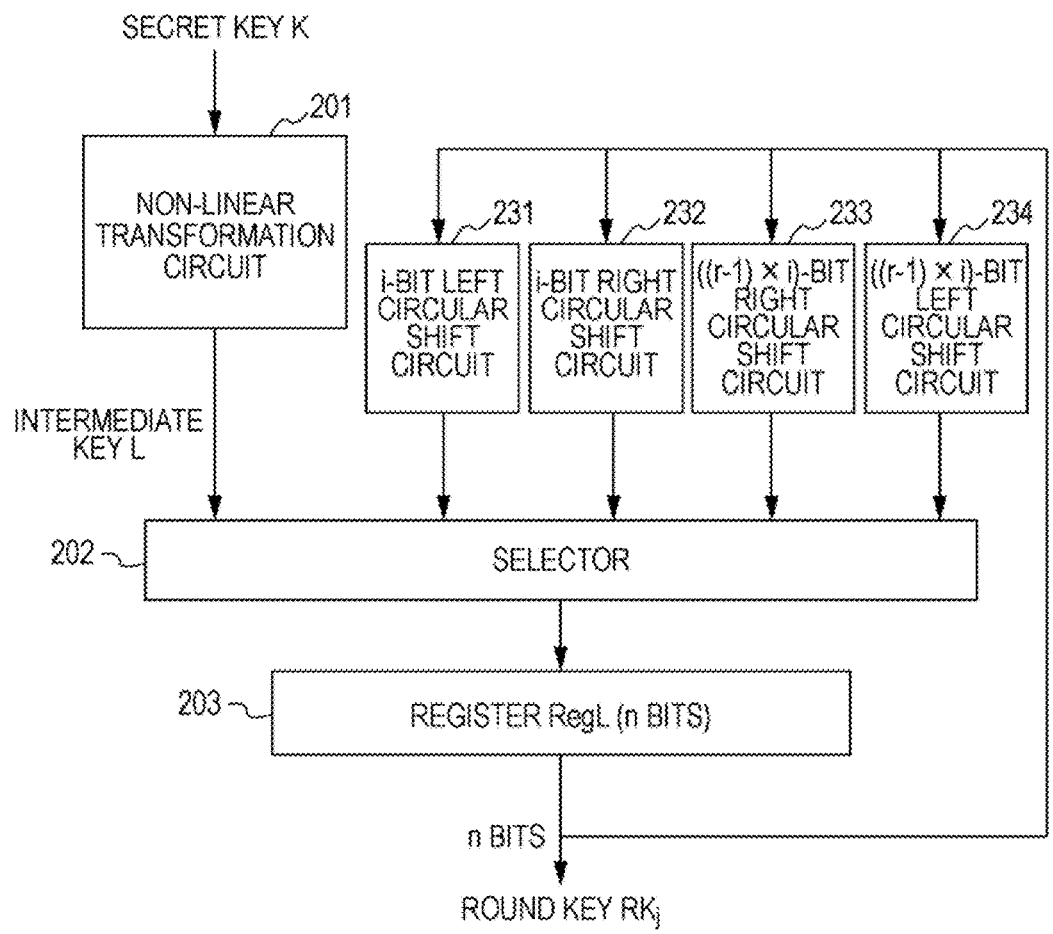
FIG. 12 is a diagram explaining an example configuration of a key scheduling part for executing a round-key generation process in both encryption and decryption.

FIG. 10 shows an example configuration of a key scheduling part for executing a round-key generation process in the encryption process;

FIG. 11 shows an example configuration of a key scheduling part for executing a round-key generation process in the decryption process; and FIG. 12 shows an example configuration of a key scheduling part for executing a round-key generation process in both encryption and decryption.

First, the configuration and process of the key scheduling part shown in FIG. 10 for executing a round-key generation process in the encryption process, will be explained. It is assumed that a secret key K has k bits. The secret key K is input to a non-linear transformation circuit 201, and a non-linear transformation process is performed to generate n-bit intermediate-key data. The intermediate-key data is represented by L.

The intermediate-key data L is input to and stored in a register RegL 203 through a selector 202. The selector 202 is connected to an i-bit left circular shift circuit 211 and an ((r−1)×i)-bit right circular shift circuit 212. Individual circular-shift processing signals are input to the register RegL 203 through the selector 202, and an i-bit left circular shift process or an ((r−1)×i)-bit right circular shift process is executed on the data stored in the register RegL 203. Note that i is an integer of one or more.

For example, the i-bit left circular shift circuit 211 executes an i-bit left circular shift of the n-bit intermediate key L stored in the register RegL 203, and generates r n-bit round key data items $\{RK_1, RK_2, \ldots, RK_{r-1}, RK_r\}$ from the intermediate key L stored in the register RegL 203 in the manner as follows:

$RK_1 = L$ $RK_2 = L <<< i$ $RK_3 = L <<< (2 \times i)$

. . .

$$RK_{r-1} = L <<< ((r-2) \times i)$$

$$RK_r = L <<< ((r-1) \times i)$$

Note that in the equations above, [<<<i] denotes an i-bit left circular shift.

$RK_1 = L$ represents data with a shift amount of zero and is equal to the intermediate key L;

$RK_2 = L<<<i$ represents data that has been circularly shifted to the left by i bit or bits with respect to the intermediate key L;

$RK_3 = L<<<(2 \times i)$ represents data that has been shifted to the left by $2 \times i$ bits with respect to the intermediate key L; and
...

The implementation configuration and process in which this method is applied will be explained with reference to FIG. 10. First, in the intermediate-key generation process, a k-bit secret key K is input to the non-linear transformation circuit 201 to generate n-bit intermediate-key data L which is stored in the round-intermediate-key register RegL 203 through the selector 202 without performing a shift process.

In the case of encryption, the processing signal of the i-bit left circular shift circuit 211 is selectively input to the round-intermediate-key register RegL 203 through the selector 202, and an i-bit circular left shift is repeatedly executed on the n-bit intermediate-key data L stored in the round-intermediate-key register RegL 203. Accordingly, round key data items $\{RK_1, RK_2, \ldots, RK_{r-1}, RK_r\}$ can be sequentially created.

When the round keys $\{RK_1, RK_2, \ldots, RK_{r-1}, RK_r\}$ for all the rounds are generated and output using this process, the data last stored in the round-intermediate-key register RegL 203 is circularly shifted to the right by $(r-1) \times i$ bits. This process is executed by selectively inputting the processing signal of the $((r-1) \times i)$-bit right circular shift circuit 212 to the round-intermediate-key register RegL 203 through the selector 202. With this right shift process, the data stored in the round-intermediate-key register RegL 203 can be returned to the unshifted initial state, namely, the intermediate-key data L.

This round-key generation process in the encryption process is expressed as below with an intermediate key L, the number of rounds r, a round key $RK_n$ for each round, and a shift amount i for a transition of each round:

```
For n=1 to r-1 do
    RK_n ← RegL
    RegL ← RegL<<<i
RK_r ← RegL
RegL ← RegL>>>((r-1)×i)
```

In the foregoing description,
<<<i denotes an i-bit left circular shift, and
>>>i denotes an i-bit right circular shift.

FIG. 11 shows an example configuration of a key scheduling part for executing a round-key generation process in the decryption process. In the key scheduling part shown in FIG. 11 for executing a round-key generation process in the decryption process, a non-linear transformation circuit 201, a selector 202, and a register RegL 203 are similar in configuration to those shown in FIG. 10, and only shift circuits 221 and 222 are different.

That is, the shift circuits 221 and 222 in the decryption process are constituted by circuits for executing shifts in the direction opposite to that of the shift circuits 211 and 212 in the encryption process, that is an i-bit right circular shift circuit 221, and
an $((r-1) \times i)$-bit left circular shift circuit 222.

In this key scheduling part in the decryption process, first, the intermediate-key data stored in the register RegL 203 is circularly shifted to the left by $(r-1) \times i$ bits by using the process of the $((r-1) \times i)$-bit left circular shift circuit 222. Thereafter, the data stored in the register RegL 203 is circularly shifted to the right by i bit or bits by using the process of the i-bit right circular shift circuit 221 each time a round key is generated in each round. With this processing sequence, round key data items are generated in the order opposite to that during the encryption process. That is, $\{RK_r, RK_{r-1}, \ldots, RK_2, RK_1\}$ can be sequentially created.

This round-key generation process in the decryption process is expressed as a processing algorithm below with an intermediate key L, the number of rounds r, a round key $RK_n$ for each round, and a shift amount i for a transition of each round:

```
RegL ← RegL<<<((r-1)×i)
For n=r to 2 do
    RK_n ← RegL
    RegL ← RegL>>>i
RK_1 ← RegL
```

In the foregoing description,
<<<i denotes an i-bit left circular shift, and
>>>i denotes an i-bit right circular shift.

Note that FIGS. 10 and 11 show configurations for executing a round-key generation process in the encryption process and a round-key generation process in the decryption process, respectively. A configuration having such functions can also be constructed. This configuration is shown in FIG. 12. In the configuration shown in FIG. 12, circular shift circuits 231 to 234 are provided, which are an i-bit left circular shift circuit 231,
an i-bit right circular shift circuit 232,
an $(r-1) \times i$-bit right circular shift circuit 233, and
an $(r-1) \times i$-bit left circular shift circuit 234, respectively.
The configuration includes all the circular shift circuits configured in FIGS. 10 and 11. In the configuration, an i-bit left circular shift, an i-bit right circular shift, an $((r-1) \times i)$-bit right circular shift, or an $((r-1) \times i)$-bit left circular shift can be selectively executed. By applying this configuration, round keys can be generated and output in either of the cases of encryption and decryption processes.

A study will be made of the configuration of a round-key generation process by using such cyclic shift processes. In particular, the status of changing a relative position between bits constituting round key data will be considered. An i-bit left cyclic shift is an action of cutting i bit or bits from the left of a bit string for which the action is to be performed, moving the cut bits to the right, and concatenating the bits. When attention is directed to specific bit data, bits located on both sides of a certain bit do not change even if an arbitrary number of cyclic shifts are executed.

In a case where a certain bit is moved to the left end or right end of the bit string, no adjacent bit exists. However, by performing a shift process again, a bit arrangement similar to previous one is obtained. That is, bits located before and after a specific bit always remain unchanged in cases other than the case where the bits are set at an end of the bit string. In this manner, the nature that bits on both sides of a bit do not change at all, that is, the unchanging property of a bit array, results in vulnerability to the condition that "round keys are independent from each other", which is a requirement for increasing the difficulty of key leakage in the cryptographic process configuration having round functions. This is not preferable.

Further, the unchanging property of a bit array also has vulnerability to key analysis due to slide attacks described previously. For example, in a case where the values of the following data items:

(A) intermediate-key data L generated based on a secret key K, and (B) expanded-key data L'<<<(s×i) obtained by circularly shifting intermediate-key data L' generated based on another secret key K' to the left by (s×i) bits are identical, round keys for individual rounds which are thereafter generated by bit shifting have identical data. That is, individual corresponding round keys in (a) and (b) below have identical data:

(a) round keys $\{RK_1, RK_2, \ldots, RK_{(r-s)-1}, RK_{(r-s)}\}$ for (r−s) stages which are generated using the intermediate-key data L (b) round keys $\{RK_{s+1}, RK_{2s+2}, \ldots RK_{2r-1}, RK_{2r}\}$ for (r−s) stages which are generated using the expanded-key data L'<<<(s×i)

This nature makes it easy to perform key analysis due to slide attacks described previously, resulting in insufficient resistance to attacks.

As explained earlier, a typical structure for executing a common-key block cipher algorithm is a Feistel structure. The Feistel structure has a structure for transforming plaintext into ciphertext by using simple iterations of a round function (F-function) which serves as a data transformation function. In a round function (F-function), a linear transformation process and a non-linear transformation process are executed. In the Feistel structure, the size of a round key to be applied in each round is n/2 bits the number of input bits n which serves as encryption processing data.

In such a case, a typical configuration is that the intermediate-key data L is generated so as to have n bits, and the upper half n/2 bits of the n bits of data are used for an odd-number round while the remaining lower n/2 bits are used as the key for the next round. In this case, it is necessary to additionally mount a circuit for selecting upper and lower bits for each round. That is, a configuration of a cryptographic processing apparatus (an exemplary shared encryption/decryption implementation) using (n/2)-bit round keys is, for example, a configuration shown in FIG. 13.

Figure 13:
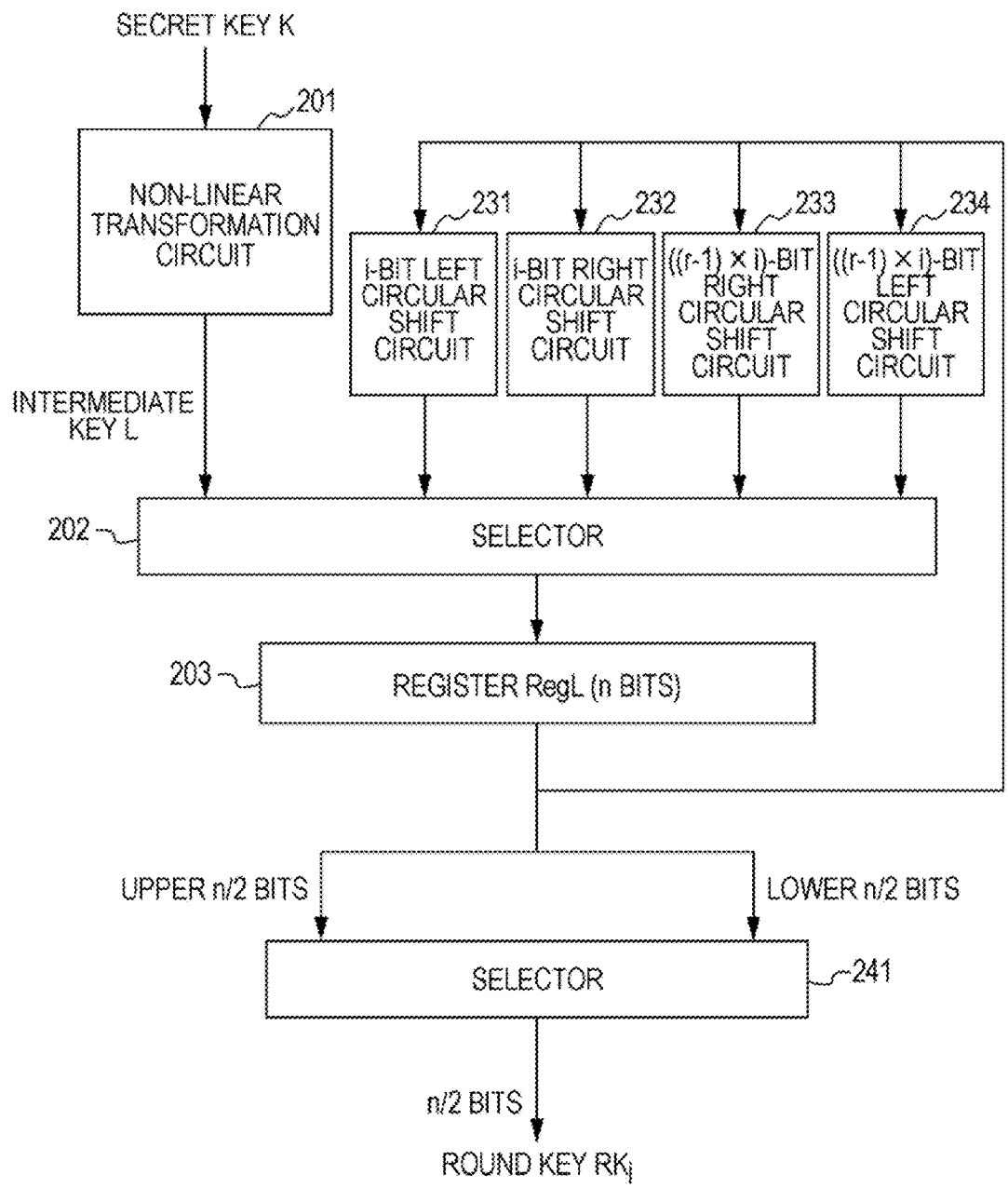
FIG. 13 is a diagram explaining an example configuration of a key scheduling part for executing a round-key generation process which can be applied in a cryptographic process based on the Feistel structure.

The configuration shown in FIG. 13 is a configuration similar to the configuration shown in FIG. 12 as explained earlier, including a non-linear transformation circuit 201, a selector 202, and a register RegL 203. The configuration further includes:

an i-bit left circular shift circuit 231;
an i-bit right circular shift circuit 232;
an ((r−1)×i)-bit right circular shift circuit 233; and
an ((r−1)×i)-bit left circular shift circuit 234.

In addition, the configuration includes a selector 241.

In the configuration, the register RegL 203 stores intermediate-key data L (n bits) which is similar to that explained previously with reference to FIG. 12, and the selector 241 outputs the upper half n/2 bits of the n-bit data stored in the register RegL 203 as round keys used for an odd-number round and outputs the remaining lower n/2 bits as the round key for the next round. In this manner, it is necessary to additionally mount the selector 241 for selecting upper and lower bits for each round.

As described above, the round-key generation method for generating round keys by performing shift processes on intermediate-key data has the following drawbacks:

Low independence between round keys due to small changes in adjacent bits

Not sufficient resistance to slide attacks

Need for an additional circuit for selecting upper and lower bit strings in the case of use in the Feistel structure (2-3) With Regard to Round-Key Generation Process Configuration According to First Exemplary Embodiment of Present Invention In the following, an explanation will be given of a round-key generation process configuration for solving the above-described problems with the round-key generation process based on the circular shift process and executing a cryptographic process with high resistance to various cryptographic attacks, that is, a high-security cryptographic process.

An exemplary embodiment which will be explained hereinafter provides an exemplary process for generating a round key by, instead of executing a circular shift process on intermediate-key data L obtained as a result of the non-linear transformation process based on a secret key K, executing a double-swap process serving as a process for changing bit positions of the intermediate-key data L. With the progress of each round, a double-swap (Double Swap) process serving as a bit position changing process is repeatedly executed.

The configuration and process of a key scheduling part, as an exemplary embodiment of a cryptographic processing apparatus of the present invention, for executing a round-key generation process by applying a double-swap (Double Swap) process will be explained with reference to FIG. 14.

Figure 14:
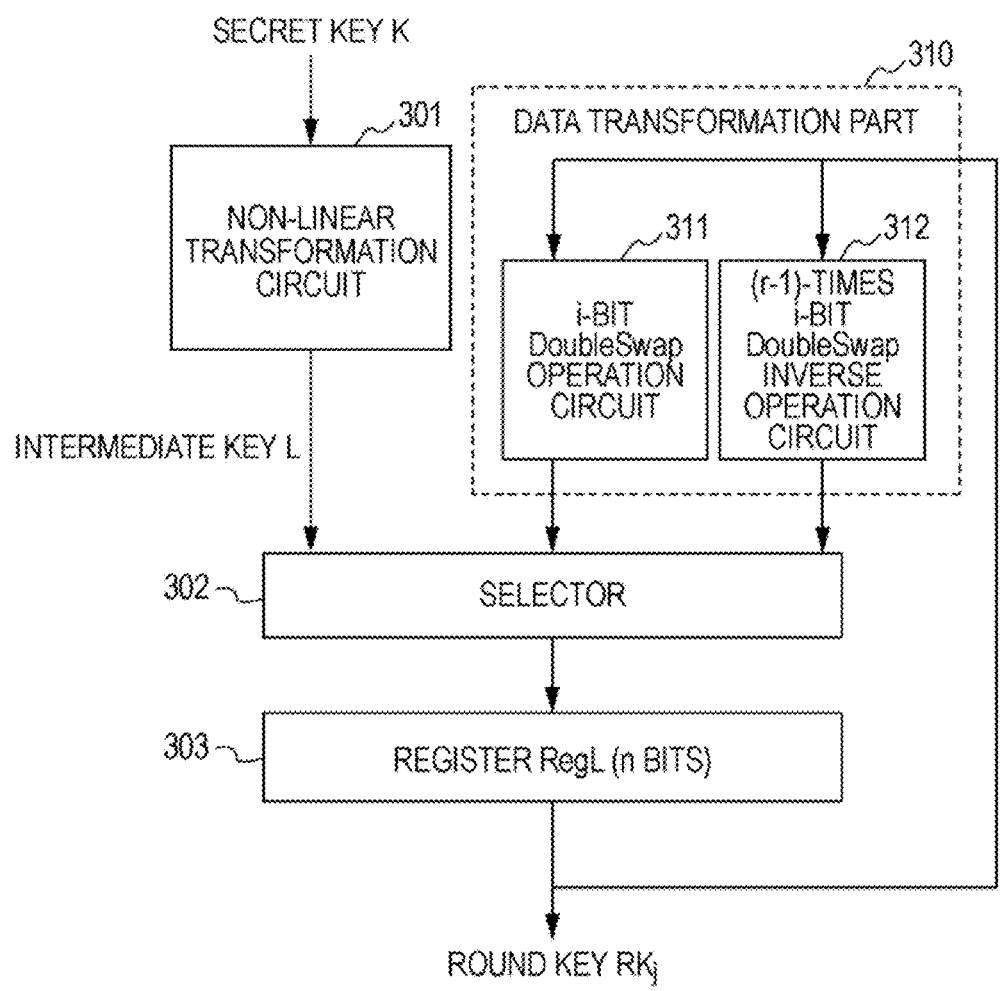
FIG. 14 is a diagram explaining an example configuration of a key scheduling part for executing a process with double-swap operation is applied in a round key generation process in the encryption process.

The configuration shown in FIG. 14 is a configuration in which the i-bit left circular shift circuit 211 in the configuration of the key scheduling part explained earlier with reference to FIG. 10 for generating round keys by using bit circular shift processes is replaced with an i-bit double-swap (Double Swap) operation circuit 311 and in which further the ((r−1)× i)-bit right circular shift circuit 212 shown in FIG. 10 is replaced with an (r−1)-times i-bit double-swap (Double Swap) inverse operation circuit 312. That is, as shown in FIG. 14, a data transformation part 310 composed of the i-bit double-swap (Double Swap) operation circuit 311 and the (r−1)-times i-bit double-swap (Double Swap) inverse operation circuit 312 is provided. The other configuration elements have a configuration similar to the configuration explained with reference to FIG. 10.

The process of the key scheduling part shown in FIG. 14 will be explained. It is assumed that a secret key K to be input to the key scheduling part has k bits. The secret key K is input to a non-linear transformation circuit 301, and a non-linear transformation process is performed to generate n-bit intermediate-key data. The intermediate-key data is represented by L.

The intermediate-key data L is input to and stored in a register RegL 303 through a selector 302. The selector 302 is connected to the individual processing sections of the data transformation part 310, that is, the i-bit double-swap (Double Swap) operation circuit 311 and the (r−1)-times i-bit double-swap (Double Swap) inverse operation circuit 312. Processing signals in the individual circuits are input to the register RegL 303 through the selector 302, and a bit position changing process is executed on the data stored in the register RegL 303. Note that i is an integer of one or more.

Figure 15:
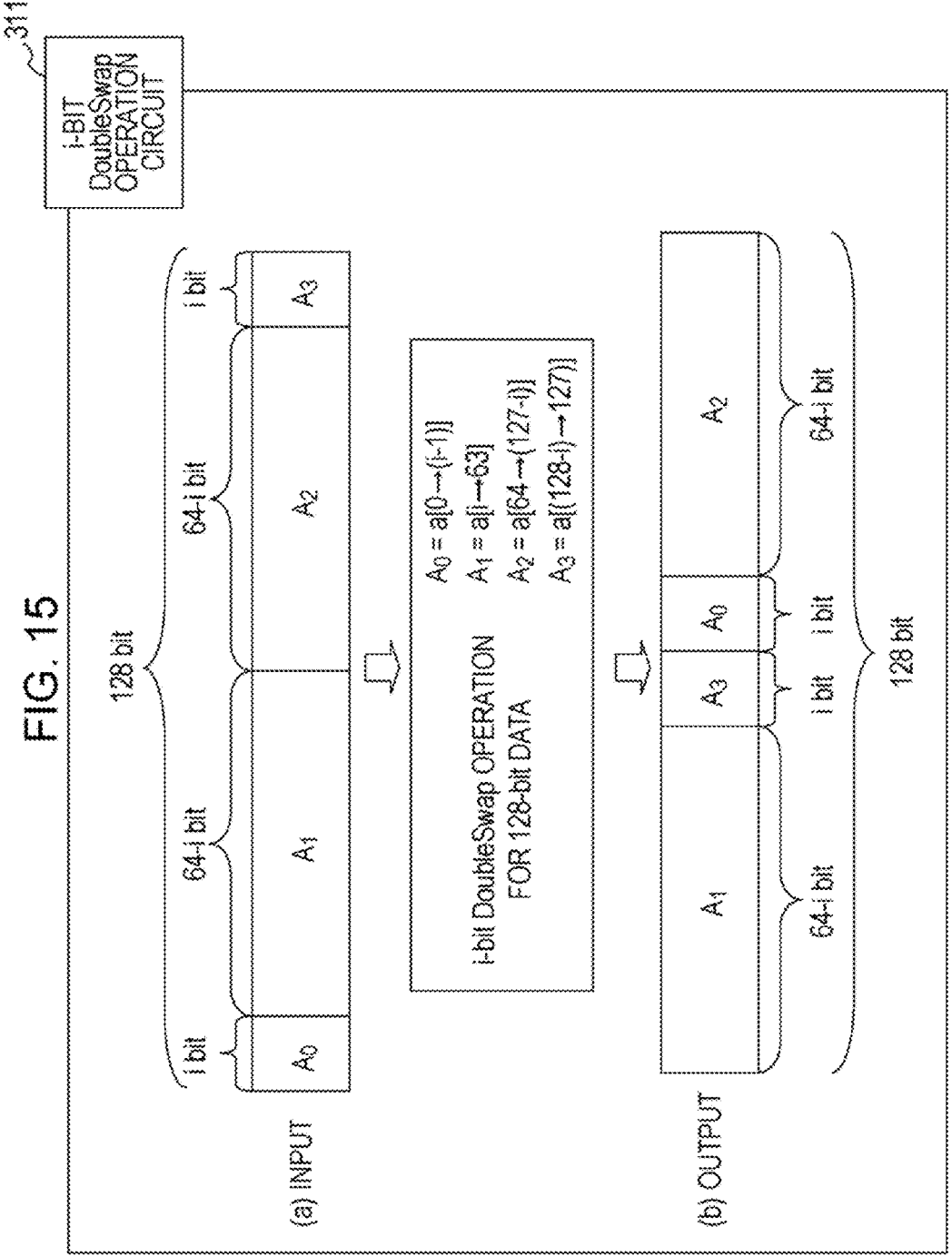
FIG. 15 is a diagram explaining a bit position changing process with i-bit double-swap operation applied.

An example of the bit position changing process executed in the i-bit double-swap (Double Swap) operation circuit 311 will be explained with reference to FIG. 15. The example of FIG. 15 shows an i-bit double-swap (Double Swap) process for 128-bit intermediate-key data L, by way of example.

It is assumed that 128 bits of data A constituting the intermediate-key data L is given by:

$$A=(a_0, a_1, \ldots, a_{126}, a_{127})$$

where an is an individual data bit of 128 bits.

It is further assumed that $a[x \to y]$:, a bit string of consecutive data bits $a_x$ to $a_y$ in the data A, and b|c: a bit string in which bit strings b and c are concatenated.

If the above representations are applied, the i-bit double-swap (Double Swap) operation for 128-bit data is defined as follows:

"i-bit double-swap (Double Swap) definition"

If data B obtained by performing an i-bit DoubleSwap operation for the 128-bit data A is given by $$B=\text{DoubleSwap}_{128,i}(A),$$

then $$B=a[i \to 63]|a[(128-i) \to 127]|a[0 \to (i-1)]|a[64 \to (127-i)]$$

is obtained.

A specific i-bit double-swap (Double Swap) operation for 128-bit data will be explained with reference to FIG. 15. In FIG. 15, part (a) shows 128 input bits, and part (b) shows 128 output bits obtained as a result of the operation.

The 128 input bits in part (a) are segmented into four parts $A_0$ to $A_3$. The bits constituting the individual segments are represented as follows:

$A_0$: $a[0 \to (i-1)]$, that is, the top i bit or bits $A_1$: $a[i \to 63]$, that is, the bits in a range from the bit subsequent to the top i bit or bits to the end bit of the first half of the data A $A_2$: $a[64 \to (127-i)]$, that is, the bits in a range from the beginning bit of the second half of the data A to the preceding bit of the last i bit or bits $A_3$: $a[(128-i) \to 127]$, that is, the last i bit or bits The i-bit double-swap (Double Swap) operation circuit 311 executes a process of permuting the bits constituting the four divisions of the data A as in the output data of FIG. 15(b). That is, the process of changing the positions of the data bits is executed so that the array of input bits:

$A_0|A_1|A_2|A_3$ is changed to the array of output bits:

$A_1|A_3|A_0|A_2$.

As a result of this process, when the data B obtained by performing an i-bit DoubleSwap operation for the 128-bit data A is given by $$B=\text{DoubleSwap}_{128,i}(A),$$

then the output B is determined by:

$$B=a[i \to 63]|a[(128-i) \to 127]|a[0 \to (i-1)]|a[64 \to (127-i)]$$

A processing signal for executing this DoubleSwap process is input to the register RegL 303 from the i-bit double-swap (Double Swap) circuit 311 shown in FIG. 14 through the selector 302 shown in FIG. 14, and the bit positions of the data stored in the register RegL 303 are changed to generate the round key for the next round. Further, in the next round, a bit position changing process performed by the i-bit double-swap (Double Swap) operation circuit 311 shown in FIG. 14, that is, the i-bit double-swap (Double Swap) process explained using FIG. 15, is executed again on the output (b) shown in FIG. 15. Thus, the round key for the next round is generated.

The DoubleSwap operation explained with reference to FIG. 15 has the following two merits:

Not so large circuit size compared with circular shifts although the relative bit positions are largely changed Effect of reducing the implementation cost when used in the Fesitel structure Note that the advantages given above will be explained later.

Figure 16:
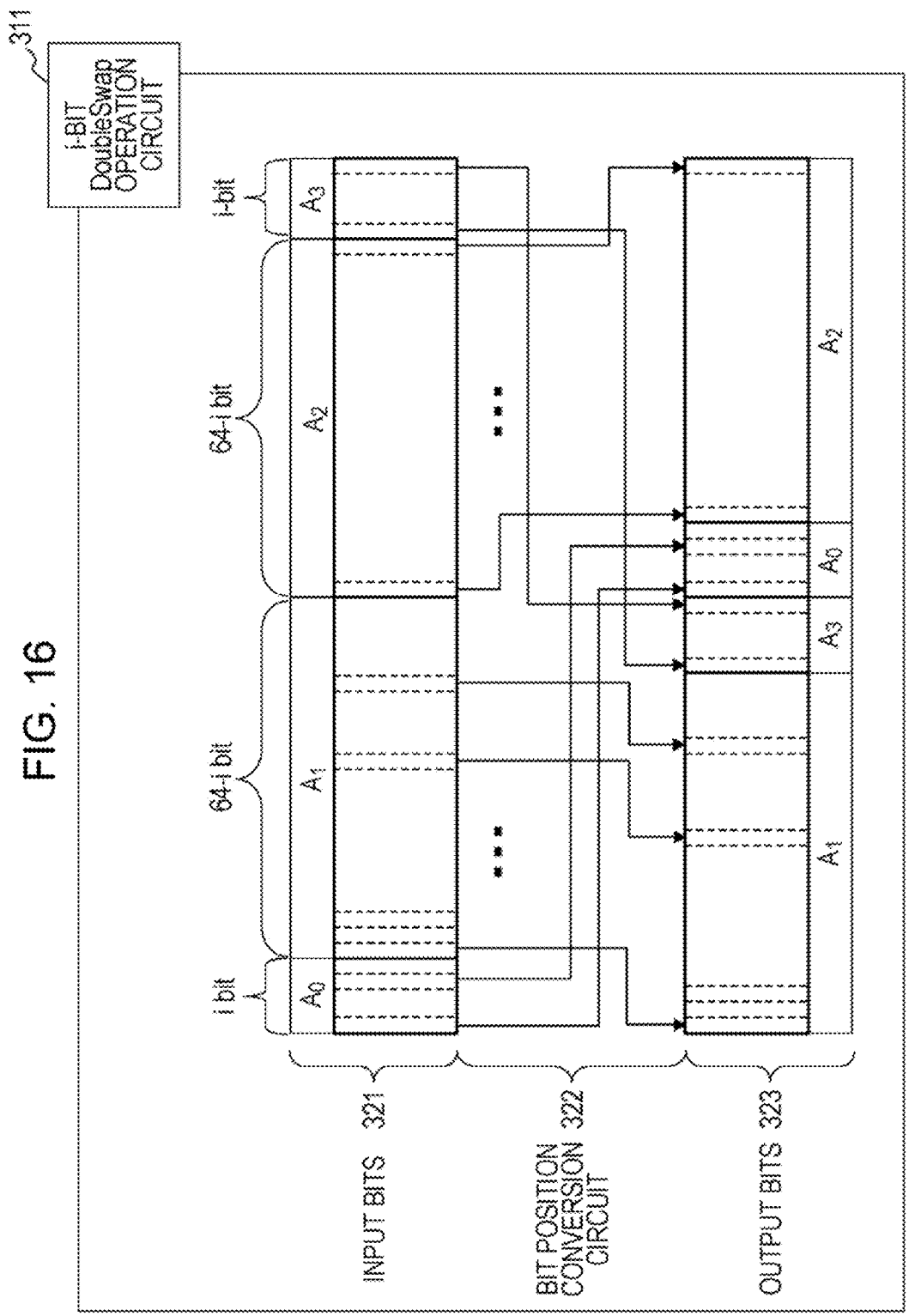
FIG. 16 is a diagram explaining an example hardware configuration for executing a bit position changing process with the i-bit double-swap operation applied.

Note that in a case where the i-bit double-swap (Double Swap) operation circuit 311 is configured by hardware, for example, the i-bit double-swap (Double Swap) operation circuit 311 can be implemented by a bit position conversion circuit 322 as shown in FIG. 16 for changing each output bit position of bits constituting input bits 321. The bit position conversion circuit 322 is configured as a circuit having an input/output unit for changing the data bits at the individual bit positions to the positions explained earlier with reference to FIG. 16, and generates and outputs output bits 323. Note that the i-bit double-swap (Double Swap) operation circuit 311 may not necessarily be configured by hardware and may be executed by using a program as software.

Further, the (r−1)-times i-bit double-swap (Double Swap) inverse operation circuit 312 of the key scheduling part shown in FIG. 14 executes a process of recovering the first intermediate-key data L after the generation of round keys to be applied to all round operations has been completed by using the bit position changing process executed in the i-bit double-swap (Double Swap) operation circuit 311.

For example, in the cryptographic process with the number of rounds r, the first intermediate-key data L is used as the first round key. Thus, i-bit double-swap (Double Swap) processes, the number of which is equal to (r−1), are performed. Accordingly, the generation of round keys used for all the r rounds is completed. The (r−1)-times i-bit double-swap (Double Swap) inverse operation circuit 312 executes a bit position changing process for the data applied to the round key for the final round, which has been generated by performing the (r−1)-th i-bit double-swap (Double Swap) process, to execute the process of recovering the first intermediate-key data L.

The DoubleSwap inverse operation is defined as follows:

"i-bit double-swap (Double Swap) inverse operation definition"

If data B obtained by performing an i-bit DoubleSwap inverse operation for the 128-bit data A is given by $$B=\text{DoubleSwap}^{-1}_{128,i}(A),$$

then $$B=a[64 \to 63+i]|a[0 \to (63-i)]|[(64+i) \to 127]|a[(64-i) \to 63]$$

is obtained.

Figure 17:
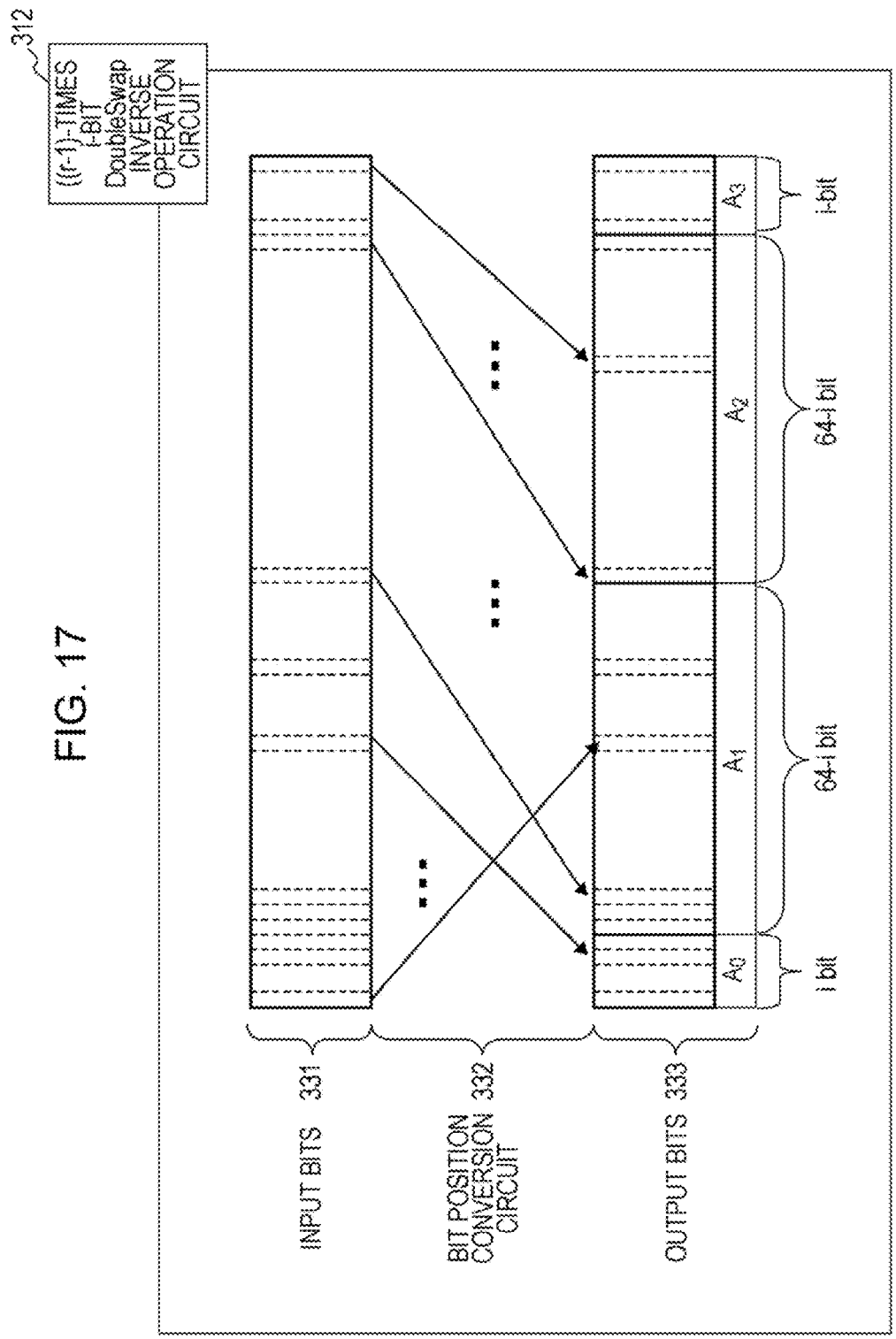
FIG. 17 is a diagram explaining an example hardware configuration for executing a bit position changing process with the (r−1) i-bit double-swap inverse operations applied.

The above definition corresponds to that for the i-bit double-swap (Double Swap) inverse operation for returning the output (b) shown in FIG. 15 to the input (a). The (r−1)-times i-bit double-swap (Double Swap) inverse operation circuit 312 is intended to execute the i-bit double-swap (Double Swap) inverse operation a number of times corresponding to (r−1). However, actually, it is not necessary to repeatedly execute the inverse operation. In a case where the (r−1)-times i-bit double-swap (Double Swap) inverse operation circuit 312 is configured by hardware, for example, the (r−1)-times i-bit double-swap (Double Swap) inverse operation circuit 312 can be implemented by a bit position conversion circuit 332 as shown in FIG. 17 for changing each output bit position of bits constituting input bits 331.

The bit position conversion circuit 332 executes a bit position changing process for the data stored in the register RegL 303 as the round key applied in the final round, that is, the input bits 331 which form data obtained after the (r−1) i-bit double-swap (Double Swap) processes, to execute the process of recovering the bit arrangement of the first intermediate-key data L in which the bit positions are not changed and generating the output bits 331. Note that, like the i-bit double-swap (Double Swap) operation circuit 311, also, the (r−1)-times i-bit double-swap (Double Swap) inverse operation circuit 312 may not necessarily be configured by hardware and may be executed by using a program as software.

Note that in the exemplary embodiment described above, a round key is set as 128-bit data and the processes for the DoubleSwap operation and inverse operation for 128-bit data have been explained; however, the DoubleSwap operation and inverse operation can also be applied to the number of bits other than 128 bits. That is, the DoubleSwap operation for 2m bits (where m is an integer more than one) of data can be generalized and defined as follows:

"i-bit double-swap (Double Swap) definition"

If data B obtained by performing an i-bit DoubleSwap operation for 2m-bit data A (where m is an integer more than one) is given by $$B = DoubleSwap_{2m,i}(A),$$

then the following representation can be obtained:

$$B = a[i \to (m-1)] \| a[(2m-i) \to (2m-1)] \| a[0 \to (i-1)] \| a[m \to (2m-1-i)]$$

Specifically, as explained earlier with reference to FIG. 15, if 2m bits are represented as bit 0 to bit (2m−1), the data bit position changing process is executed so that the four data divisions:

$A_0$: $a[0 \to (i-1)]$, that is, the top i bit or bits;
$A_1$: $a[i \to (m-1)]$, that is, the bits in a range from the bit subsequent to the top i bit or bits to the end bit of the first half of the data A;
$A_2$: $a[m \to (2m-1-i)]$, that is, the bits in a range from the beginning bit of the second half of the data A to the preceding bit of the last i bit or bits; and
$A_3$: $a[(2m-i) \to (2m-1)]$, that is, the last i bit or bits are changed from the array of input bits:
$A_0 | A_1 | A_2 | A_3$ to the array of output bits:
$A_1 | A_3 | A_0 | A_2$.

The inverse transformation can be similarly defined as follows.

The DoubleSwap inverse operation executed by the (r−1)-times i-bit double-swap (Double Swap) inverse operation circuit 312 is defined as follows:

"i-bit double-swap (Double Swap) inverse operation definition"

If data B obtained by performing an i-bit DoubleSwap inverse operation for the 2m-bit data A (where m is an integer more than one) is given by $$B = DoubleSwap^{-1}_{2m,i}(A),$$

then $$B = a[m \to (m-1)+i] \| a[0 \to ((m-1)-i)] \| [(m+i) \to (2m-1)] \| a[(m-i) \to (m-1)]$$

is obtained.

In this manner, the configuration of the key scheduling part shown in FIG. 14 for generating round keys is a configuration in which the i-bit left circular shift circuit 211 in the configuration of the key scheduling part explained earlier with reference to FIG. 10 for generating round keys by using bit circular shift processes is replaced with the i-bit double-swap (Double Swap) operation circuit 311 and in which further the ((r−1)×i)-bit right circular shift circuit 212 shown in FIG. 10 is replaced with the (r−1)-times i-bit double-swap (Double Swap) inverse operation circuit 312. Each round key applied in encryption is generated as follows.

The k-bit secret key K to be input to the key scheduling part is input to the non-linear transformation circuit 301, and a non-linear transformation process is performed to generate n-bit intermediate-key data L. The intermediate-key data L is stored in the register RegL 303 through the selector 302. The data first stored in the register RegL 303 is output as a round key for the first round. Further, this data is subjected to a bit position changing process performed by the i-bit double-swap (Double Swap) operation circuit 311, that is, the i-bit double-swap (Double Swap) operation serving as the bit position changing process explained earlier with reference to FIG. 15. The result of the operation is stored in the register RegL 303. This register-stored data is output as the round key for the next round.

Further, the double-swap (Double Swap) operation is repeatedly executed on this register-stored data by the i-bit double-swap (Double Swap) operation circuit 311. In this manner, round keys $RK_1$, $RK_2$, ..., $RK_{r-1}$, and $RK_r$ to be applied in individual round functions are generated. Finally, the data stored in the register RegL 303 is subjected to a bit position changing process corresponding to the operation equivalent to the (r−1)-th DoubleSwap inverse operation by the (r−1)-times i-bit double-swap (Double Swap) inverse operation circuit 312. The result of the execution of the operation is stored in the register RegL 303. This data is data having the same bit arrangement as that of the intermediate key L first input to the register RegL 303.

In the cryptographic process with the number of rounds r, the processing algorithm executed by the key scheduling part can be expressed as follows:

```
For i=1 to r−1 do
    RK_i ← RegL
    RegL ← DoubleSwap_{n,i}(RegL)
RK_r ← RegL
RegL ← DoubleSwap^{-1}_{n,i}(...(DoubleSwap^{-1}_{n,i}(DoubleSwap^{-1}_{n,i}(RegL))))
```

In the above algorithm:

```
For i=1 to r−1 do
    RK_i ← RegL
    RegL ← DoubleSwap_{n,i}(RegL)
RK_r ← (RegL)L
```

The above processes correspond to round key generation processes based on the repeated execution of an i-bit double-swap process performed in the i-bit double-swap (Double Swap) operation circuit 311. The final process, that is, the following process:

$$RegL \leftarrow DoubleSwap^{-1}_{n,i}(\ldots(DoubleSwap^{-1}_{n,i}(DoubleSwap^{-1}_{n,i}(RegL))))$$

corresponds to the process of generating the original intermediate key L by performing the operation corresponding to the (r−1)-th DoubleSwap inverse operation performed in the (r−1)-times i-bit double-swap (Double Swap) inverse operation circuit 312.

As explained earlier with reference to FIG. 17, the last (r−1)-th DoubleSwap inverse transformation can be implemented as one function as a bit position permutation operation, and can be realized with a circuit size substantially equal to that of the operation in which (r−1) cyclic shift operations are performed as a single operation. Consequently, a high-security cryptographic process configuration in which the relevance of individual round keys can be reduced by effectively changing the bit positions can be realized without increasing the circuit size, as compared with that when cyclic shift operations are used.

Figure 18:
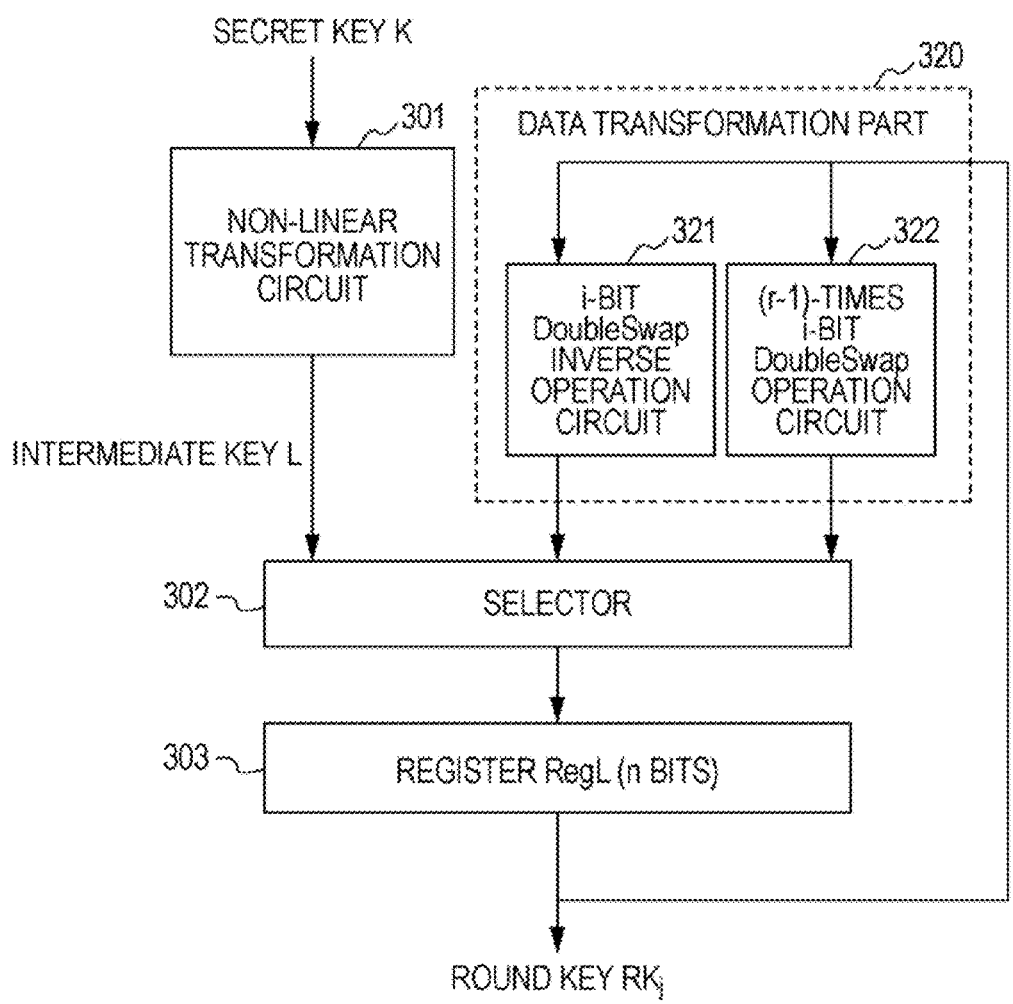
FIG. 18 is a diagram explaining an example configuration of a key scheduling part for executing a process with the double-swap operation applied in a round-key generation process in the decryption process.

FIG. 18 shows an example configuration of a key scheduling part for executing a round-key generation process in the case of executing a decryption process. In the key scheduling part shown in FIG. 18 for executing a round-key generation process in the decryption process, a non-linear transformation circuit 301, a selector 302, and a register RegL 303 are similar in configuration to those shown in FIG. 14. The key scheduling part includes a data transformation part 320 in which an (r−1)-times i-bit double-swap (Double Swap) inverse operation circuit 321 is set instead of the i-bit double-swap (Double Swap) operation circuit 311 shown in FIG. 14 and in which an i-bit double-swap (Double Swap) operation circuit 322 is set instead of the (r−1)-times i-bit double-swap (Double Swap) inverse operation circuit 312 shown in FIG. 14. The other configuration elements have a configuration similar to the configuration explained with reference to FIG. 14.

The process of the key scheduling part shown in FIG. 18 will be explained. It is assumed that a secret key K to be input to the key scheduling part has k bits. The secret key K is input to the non-linear transformation circuit 301, and a non-linear transformation process is performed to generate n-bit intermediate-key data. The intermediate-key data is represented by L.

The intermediate-key data L is input to and stored in the register RegL 303 through the selector 302. The selector 302 is connected to the i-bit double-swap (Double Swap) inverse operation circuit 321 and the (r−1)-times i-bit double-swap (Double Swap) operation circuit 322. Individual processing signals in the individual circuits are input to the register RegL 303 through the selector 302, and a bit position changing process is executed on the data stored in the register RegL 303. Note that i is an integer of one or more.

In the decryption process, the r round keys for the r rounds, which have been used in the cryptographic process, are generated and output in the order opposite to that in the cryptographic process. Therefore, in the key scheduling part in the decryption process, first, the intermediate-key data L stored in the register RegL 303 is input to the (r−1)-times i-bit double-swap (Double Swap) operation circuit 322, and the operation corresponding to the (r−1)-th DoubleSwap operation is executed on the data stored in the register RegL 303. With this process, the round key applied to the final round in the cryptographic process is generated.

This round key is output as the first round key in the decryption process. Further, this round key data is input to the i-bit double-swap (Double Swap) inverse operation circuit 321.

In the i-bit double-swap (Double Swap) inverse operation circuit 321, a process reverse to the process explained earlier with reference to FIG. 15 is executed. That is, the output shown in FIG. 15($b$) is set as the input value, and a bit position changing process is executed so that the input shown in FIG. 15($a$) is set as the output value. A result of this process is stored in the register RegL 303 and is used as the round key for the next round. Further, in the next round, the values stored in the register RegL 303 are subjected to an i-bit double-swap (Double Swap) inverse operation process by the i-bit double-swap (Double Swap) inverse operation circuit 321, and the changing of the bit positions is executed. Thus, the round key corresponding to the next round is generated.

In this manner, the i-bit double-swap (Double Swap) inverse operation circuit 321 performs a DoubleSwap inverse operation on data stored in the register RegL 303 for each round. Thus, as explained earlier with reference to FIG. 9, the round keys: $RK_r$, $RK_{r-1}$, ..., $RK_2$, $RK_1$ to be applied to individual round functions can be generated and output in turn.

Note that, similarly to that explained earlier with reference to FIGS. 16 and 17, the i-bit double-swap (Double Swap) inverse operation circuit 321 and (r−1)-times i-bit double-swap (Double Swap) operation circuit 322 used in the decryption process can also be configured by hardware having a bit position conversion circuit or may be executed by using a program as software.

In the decryption process with the number of rounds r, the processing algorithm executed by the key scheduling part can be expressed as follows:

$$\text{RegL} \leftarrow \text{DoubleSwap}_{n,i}(...(\text{DoubleSwap}_{n,i}(\text{DoubleSwap}_{n,i}(\text{RegL}))))$$
$$\text{For } i=r \text{ to } 2 \text{ do}$$
$$\quad RK_i \leftarrow \text{RegL}$$
$$\quad \text{RegL} \leftarrow \text{DoubleSwap}^{-1}_{n,i}(\text{RegL})$$
$$RK_1 \leftarrow \text{RegL}$$

In the above algorithm, the first process, that is, the following process:

$$\text{RegL} \leftarrow \text{DoubleSwap}_{n,i}(...(\text{DoubleSwap}_{n,i}(\text{DoubleSwap}_{n,i}(\text{RegL}))))$$

corresponds to the process of generating the round key for the final round in the cryptographic process, that is, the first round key in the decryption process, from the original intermediate key L by performing the operation corresponding to the (r−1)-th DoubleSwap operation performed in the (r−1)-times i-bit double-swap (Double Swap) operation circuit 322.

The subsequent step, that is, the following step:

$$\text{For } i=r \text{ to } 2 \text{ do}$$
$$\quad RK_i \leftarrow \text{RegL}$$
$$\quad \text{RegL} \leftarrow \text{DoubleSwap}^{-1}_{n,i}(\text{RegL})$$
$$RK_1 \leftarrow \text{RegL}$$

corresponds to the round-key generation process for the second and subsequent rounds in the decryption process, and is a round-key generation process performed by the execution of the DoubleSwap inverse operation in the i-bit double-swap (Double Swap) inverse operation circuit 321.

Figure 19:
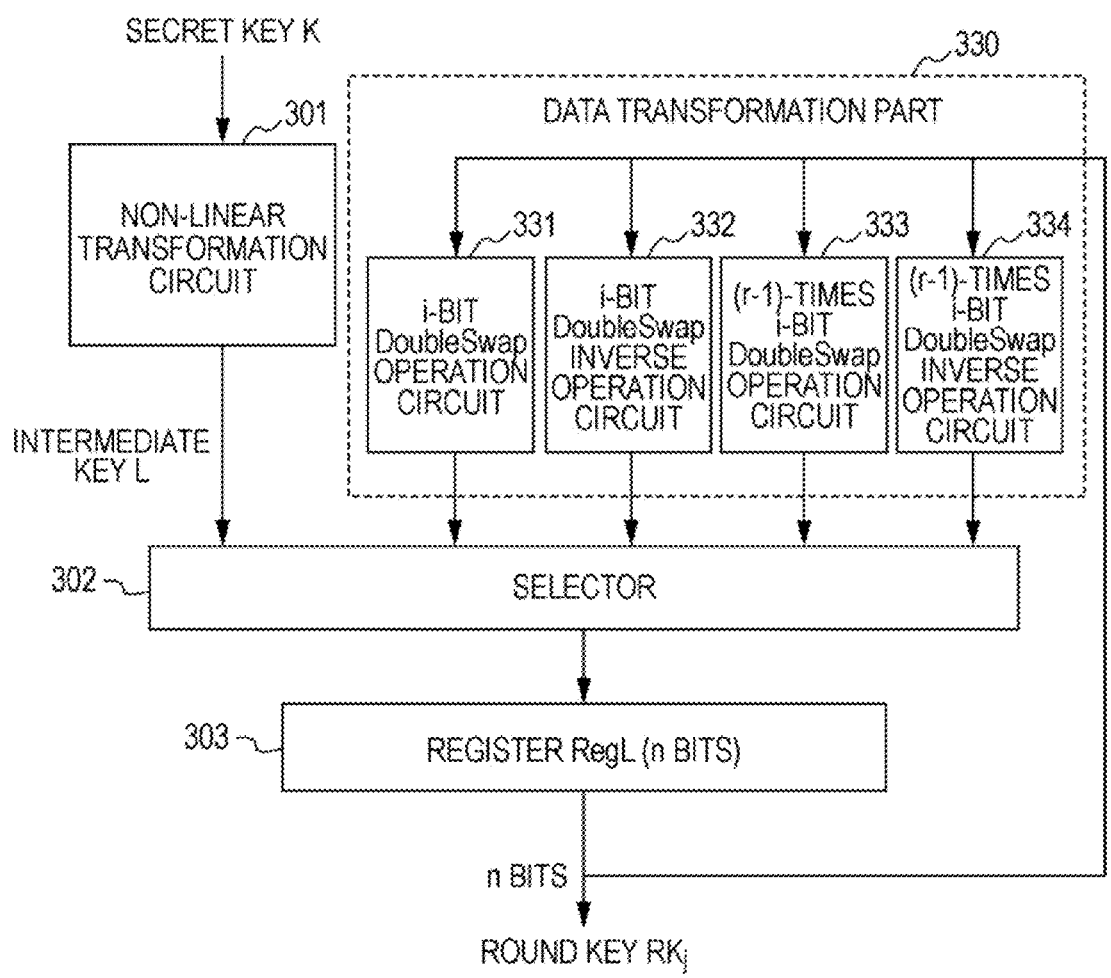
FIG. 19 is a diagram explaining an example configuration of a key scheduling part for executing a process with the double-swap operation applied in a round-key generation process in both encryption and decryption.

Note that FIGS. 14 and 18 show configurations for executing a round-key generation process in the encryption process and a round-key generation process in the decryption process, respectively. A configuration having those functions can also be constructed. This configuration is shown in FIG. 19. In the configuration shown in FIG. 19, a non-linear transformation circuit 301, a selector 302, and a register RegL 303 are similar in configuration to those shown in FIGS. 14 and 18. Further, a data transformation part 330 is configured to include all the double-swap (Double Swap) operation and inverse operation circuits shown in FIGS. 14 and 18. That is, the configuration has the data transformation part 330 that includes the following bit position conversion processing circuits:

an i-bit double-swap (Double Swap) operation circuit 331 an i-bit double-swap (Double Swap) inverse operation circuit 332 an (r−1)-times i-bit double-swap (Double Swap) operation circuit 333 an (r−1)-times i-bit double-swap (Double Swap) inverse operation circuit 334

In this configuration, both in the encryption process and the decryption process, once intermediate-key data L is generated and stored in the register RegL 303, the DoubleSwap operation, the DoubleSwap inverse operation, operations corresponding to (r−1) DoubleSwap operations, and operations corresponding to (r−1) DoubleSwap inverse operations can be performed. Round keys used at the time of encryption/decryption can be generated.

As has been explained, the round-key generation process performed in the cryptographic processing apparatus of the present invention is configured to generate a round key by performing, instead of a round-key generation process based on a shift process, an i-bit double-swap (Double Swap) operation process or inverse operation process. With this process, a high-security cryptographic process configuration in which the relevance of individual round keys can be reduced by effectively changing the bit positions can be realized without increasing the circuit size, as compared with that when cyclic shift operations are used. In the following, it is assumed that the number of rounds r is an even number.

In the changing of bit positions based on double-swap (DoubleSwap) transformation or inverse transformation, unlike a shift process, the order of adjacent bits is permuted in various ways. Consequently, the similarity or relevance of individual round keys can be reduced. This effective bit position permutation process based on double-swap (DoubleSwap) transformation or inverse transformation will be explained with reference to FIG. 20.

Figure 20:
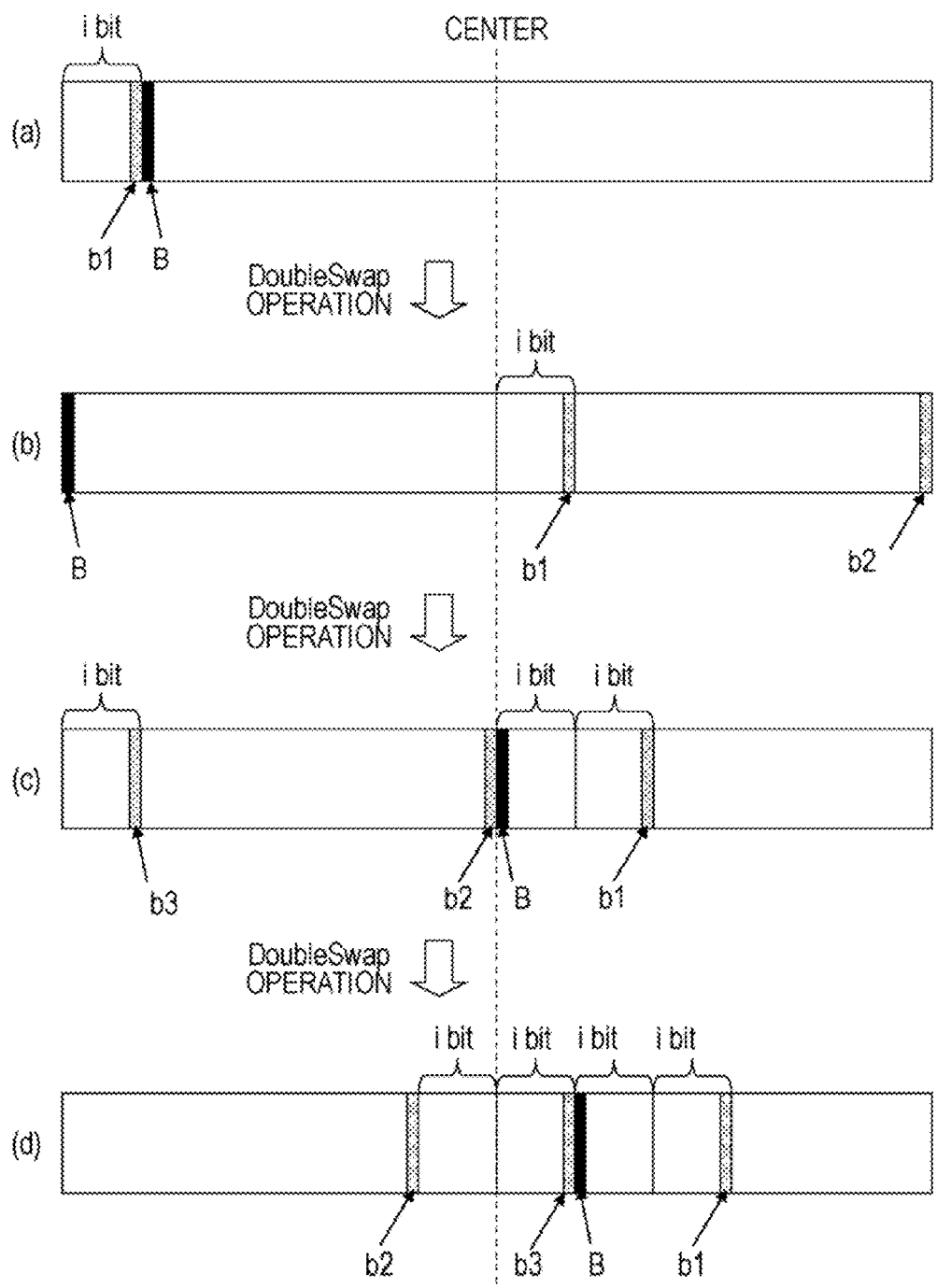
FIG. 20 is a diagram explaining a bit position changing process with the i-bit double-swap operation applied.

FIG. 20 is a diagram explaining changes of bit positions caused by performing a double-swap transformation process for 128-bit data, and shows the following four data items:

(a) initial intermediate-key data (b) data obtained after the double-swap transformation process is executed once (c) data obtained after the double-swap transformation process is executed twice (d) data obtained after the double-swap transformation process is executed three times In (a) initial intermediate-key data, attention is directed to bit [B] at the (i+1)-th position from the top and bit [b1] positioned immediately to the left of this bit, and a case where an i-bit DoubleSwap transformation is executed is considered.

In (a) initial intermediate-key data, bit [b1] at the i-th position from the left is left adjacent to [B]. Here, when the DoubleSwap transformation is applied once, then (b) data obtained after the double-swap transformation process is executed once is set.

In the data of part (b), [B] is moved to the left end of the data. At this time, no bit is present to the left of [B]. When the DoubleSwap transformation is applied once again, then (c) data obtained after the double-swap transformation process is executed twice is set.

In the data of part (c), [B] is moved to the 65th bit position from the left end of the data. In this state, bit [b2] positioned to the left of [B] is bit data [b2] that was at the right end in the data of part (b). When the DoubleSwap transformation is applied once again, then (d) data obtained after the double-swap transformation process is executed three times is set.

In the data of part (d), [B] is moved to the (65+i)-th bit position from the left end of the data. In this state, bit [b3] positioned to the left of [B] is bit data [b3] that was at the i-th position from the left end in the data of part (c).

In this manner, attention is directed to bit [B] at one bit position and the changing of an adjacent bit (left adjacent bit) is analyzed by using the double-swap transformation process. Then, it is understood that information on a bit adjacent to bit [B] changes in the manner of [b1]→[non-presence]→[b2]→[b3]. This changing of the adjacent bit occurs at the plurality of bit positions that constitute the data.

Fundamentally, such changing of an adjacent bit does not occur in a shift process. Therefore, the relevance of round keys occurs. However, by changing the bit positions using a double-swap process according to the present invention, the order of bits is permuted, resulting in increase in randomness of round keys.

In this manner, in the round-key generation process in the cryptographic processing apparatus of the present invention, a configuration for generating a round key by performing, instead of a round-key generation process based on a shift process, an i-bit double-swap (Double Swap) operation process or inverse operation process is applied. Therefore, a high-security cryptographic process configuration in which the relevance of individual round keys is reduced by effectively changing the bit positions can be realized without increasing the circuit size.

(2-4) With Regard to Round-Key Generation Process Configuration According to Second Exemplary Embodiment of Present Invention Next, an explanation will be given of an exemplary embodiment in which, as in a Feistel cipher, when it is assumed that target data for which the cryptographic process is to be performed has n bits, the double-swap (DoubleSwap) operation described above is applied in a configuration using n/2 bits as a round key.

In the exemplary embodiment described previously, an example in which target data for which the cryptographic process is to be performed has n bits and in which a round key is also used as n-bit data has been explained. However, as has been explained earlier with reference to FIG. 13, for example, in a Feistel cipher, a round key has n/2 bits. As explained with reference to FIG. 13, in a configuration for executing a shift process, a configuration has been employed in which the intermediate-key data L is generated so as to have a size of n bits and in which upper and lower bits are used in two rounds so that a shift process is performed once for two rounds.

However, as described previously, round keys generated using such shift processes have drawbacks of high relevance of the individual round keys and low resistance to attacks. Further, a need exists for an additional circuit for selecting upper and lower bits (the selector 241 shown in FIG. 13), resulting in increased implementation cost or area. This is not preferable. In the following, an example configuration of a key scheduling part, in which such a selector is omitted, for generating n-bit intermediate-key data and outputting n/2-bit round keys by applying the double-swap (DoubleSwap) operation and inverse operation described above will be explained with reference to FIG. 21.

Figure 21:
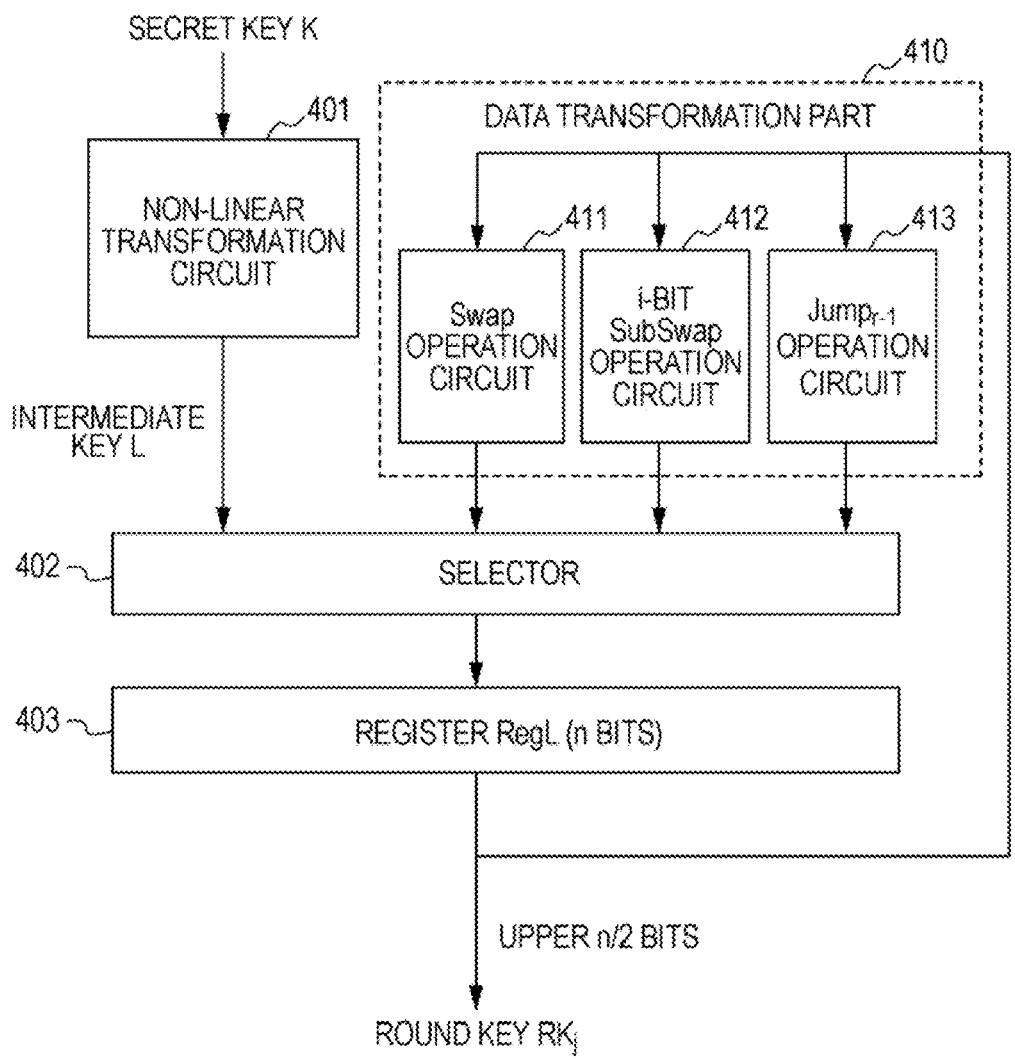
FIG. 21 is a diagram explaining an example configuration of a key scheduling part for executing a process with the swap operation and sub-swap operation applied in a round-key generation process in the encryption process.

In this exemplary process, the double-swap (DoubleSwap) operation is configured such that two stages of processes, that is
(a) swap (Swap) operation, and
(b) i-bit sub-swap (SubSwap) operation,
are alternately executed. That is:

double-swap (DoubleSwap) operation=swap (Swap) operation+i-bit sub-swap (SubSwap) operation In the configuration shown in FIG. 21, a non-linear transformation circuit 401, a selector 402, and a register RegL 403 have a configuration similar to that shown in FIG. 19. However, in the configuration shown in FIG. 21, the double-swap operation and inverse operation circuits used in the configuration shown in FIG. 19 are not provided. Instead, a data transformation part 410 is provided, which includes:
 a swap (Swap) operation circuit 411;
 an i-bit sub-swap (SubSwap) operation circuit 412; and
 a jump (Jump$_{r-1}$) operation circuit 413.
Note that i is an integer of one or more.

First, an explanation will be given of a process for generating n/2-bit round keys in the encryption process. It is assumed that a secret key K to be input to the key scheduling part has k bits. The secret key K is input to the non-linear transformation circuit 401, and a non-linear transformation process is performed to generate n-bit intermediate-key data. The intermediate-key data is represented by L.

The intermediate-key data L is input to and stored in the register RegL 403 through the selector 402. The selector 402 is connected to the following bit position changing processing circuits:
 the swap (Swap) operation circuit 411
 the i-bit sub-swap (SubSwap) operation circuit 412
 the jump (Jump$_{r-1}$) operation circuit 413
A bit position changing process is executed on the data stored in the register RegL 403 according to a preset algorithm.

The swap operation performed by the swap (Swap) operation circuit 411 and the i-bit sub-swap operation performed by the i-bit sub-swap (SubSwap) operation circuit 412 are alternately executed on the data stored in the register RegL 403 depending on the round to generate round keys: $RK_1$, $RK_2$, ..., $RK_{r-1}$, $RK_r$ to be applied in individual round functions. Note that the data stored in the register RegL 403 has n bits, and the swap operation performed by the swap (Swap) operation circuit 411 and the i-bit sub-swap operation performed by the i-bit sub-swap (SubSwap) operation circuit 412 are executed on the n-bit data stored in the register RegL 403. However, it is assumed that only n/2-bit data in the n-bit data stored in the register RegL 403 is always output as a round key. For example, the upper n/2 bits in the n-bit data stored in the register RegL 403 are output as each round key.

At the time when the generation of all the rounds (r rounds) is completed, the n-bit data finally stored in the register RegL 403 executes the process of recovering the first initial intermediate-key data L. This process is executed by the jump (Jump$_{r-1}$) operation circuit 413.

Figure 22:
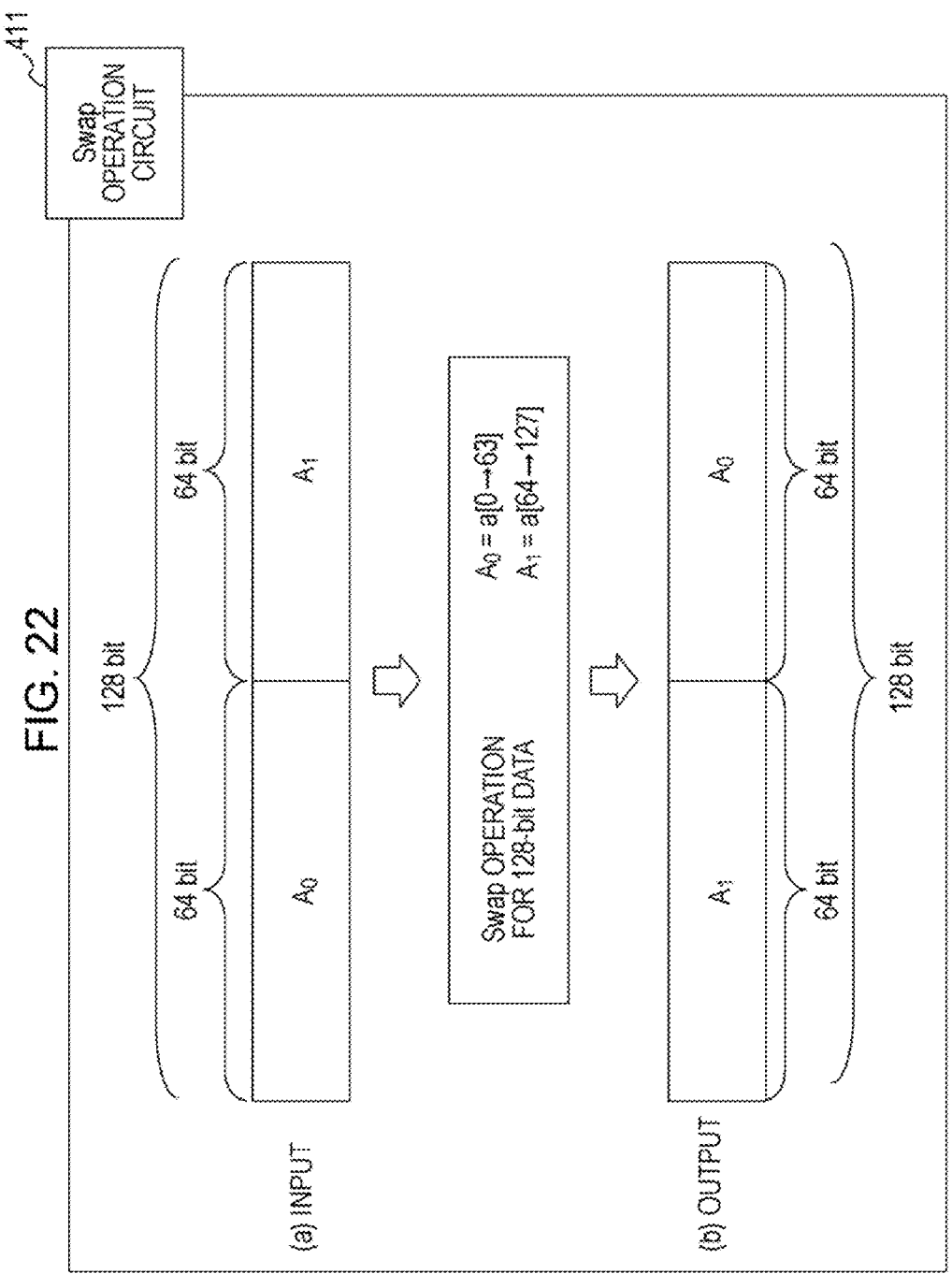
FIG. 22 is a diagram explaining a bit position changing process with the swap operation applied.

An example of the bit position changing process executed by the swap (Swap) operation circuit 411 will be explained with reference to FIG. 22. FIG. 22 shows an exemplary process for swapping (Swap) 128-bit intermediate-key data L.

The definition of the swap (Swap) operation will be explained.

It is assumed that 128-bit data A is represented as:

$$A=(a_0, a_1, \ldots, a_{126}, a_{127}),$$

where $a_n$ is individual bit data of 128 bits.

It is further assumed that
 $a[x \rightarrow y]$:, a bit string of consecutive data bits $a_x$ to $a_y$ in the data A, and
 b|c: a bit string in which bit strings b and c are concatenated.

The swap (Swap) operation for 128-bit data can be defined as follows:
 "Swap (Swap) operation definition"
 If data B obtained by performing a Swap operation for the 128-bit data A is given by $$B=\text{Swap128}(A),$$

then $$B=a[64 \rightarrow 127]|a[0 \rightarrow 63]$$

is obtained.

That is, as shown in FIG. 22, the process of permuting the upper half data $A_0$ and lower half data $A_1$ of input data (a) to generate output (b) is a bit position changing process based on the swap (Swap) operation. Note that the Swap operation is an inverse transformation itself. That is:

Swap Operation=Swap Inverse Operation

Note that in the example described above, the Swap operation for 128-bit data has been defined. A generalized Swap operation for 2m bits (where m is an integer more than one) of data can be defined as follows:
 "Swap (Swap) operation definition"
 If data B obtained by performing a Swap operation for 2m-bit data A (where m is an integer more than one) is given by $$B=\text{Swap}_{2m}(A),$$

then $$B=a[m \rightarrow (2m-1)]|a[0 \rightarrow (m-1)]$$

can be expressed.

Figure 23:
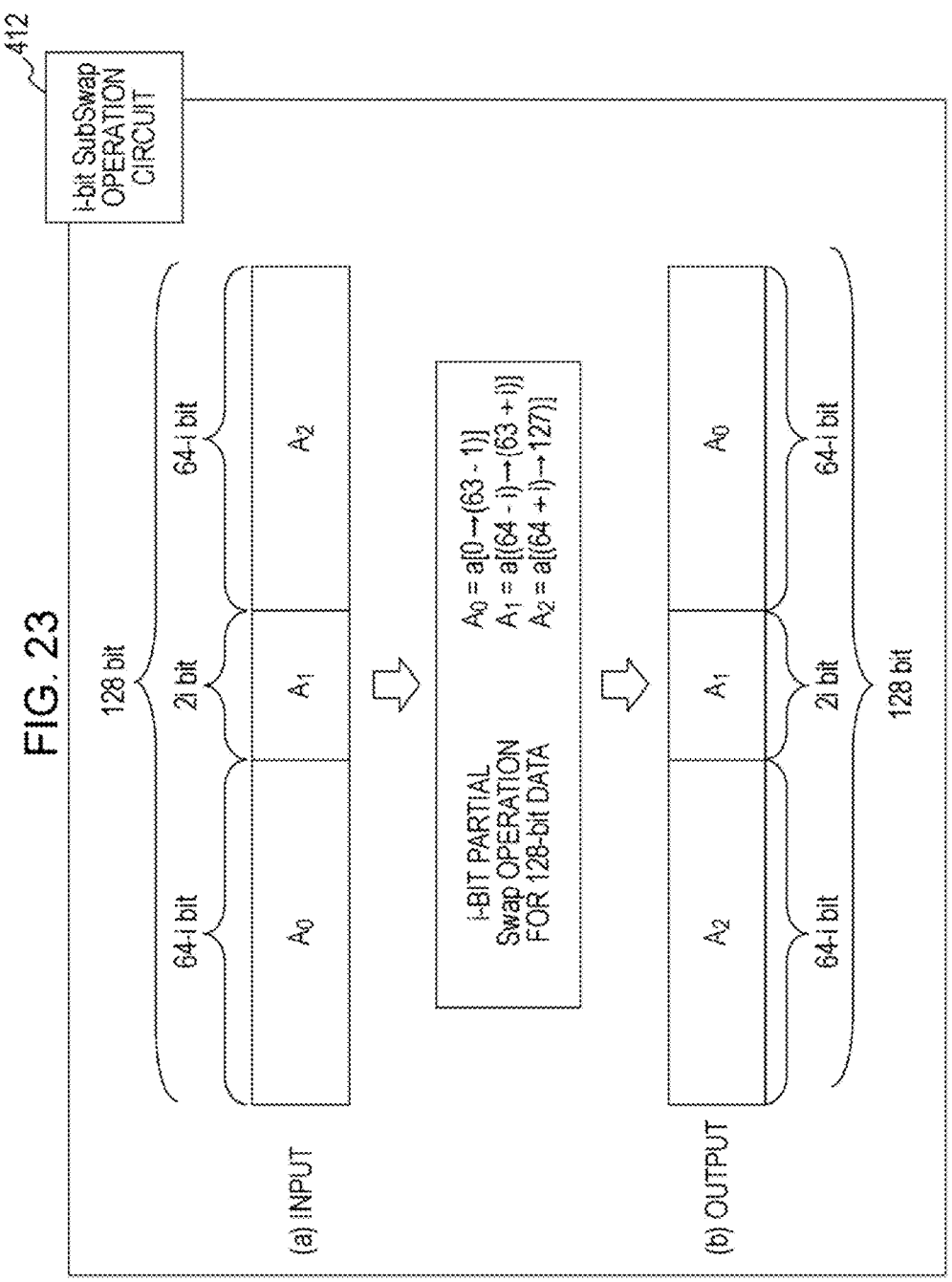
FIG. 23 is a diagram explaining a bit position changing process with the i-bit sub-swap operation applied.

Next, an example of the bit position changing process executed by the i-bit sub-swap (SubSwap) operation circuit 412 will be explained with reference to FIG. 23. FIG. 23 shows an exemplary sub-swap (SubSwap) process for 128-bit data.

The definition of the i-bit sub-swap (SubSwap) operation will be explained.

The i-bit sub-swap (SubSwap) operation for 128-bit data can be defined as follows:
 "i-bit sub-swap (SubSwap) operation definition"
 If data B obtained by performing an i-bit sub-swap (SubSwap) operation for 128-bit data A is given by $$B=\text{SubSwap}_{128,i}(A),$$

then $$B=a[(64+i) \rightarrow 127]|a[(64-i) \rightarrow (63+i)]|a[0 \rightarrow (63-i)]$$

is obtained.

That is, as shown in FIG. 23, the process of fixing 2i-bit data $A_1$ in the center of the input data (a) and permuting upper bitte data $A_0$ and lower bit data $A_2$, except for the data $A_1$, to generate the output (b) is a bit position changing process based on the i-bit sub-swap (SubSwap) operation. Note that the sub-swap (SubSwap) operation is also an inverse transformation itself.

Note that in the example described above, the SubSwap operation for 128-bit data has been defined. A generalized SubSwap operation for 2m bits (where m is an integer more than one) of data can be defined as follows:

"i-bit sub-swap (SubSwap) operation definition"

If data B obtained by performing an i-bit sub-swap (Sub-Swap) operation for 2m-bit data A (where m is an integer more than one) is given by $$B = SubSwap_{2m, i}(A),$$

then $$B = a[(m+i) \to 127] | a[(m-i) \to (m-1+i)] | a[0(m-1-i)]$$

can be expressed.

The operations explained with reference to FIGS. 22 and 23, namely, a single swap (Swap) operation, and a single sub-swap (SubSwap) operation, are consecutively executed, whereby the bit positions are changed in a manner similar to that in the bit position changing process based on the double-swap (DoubleSwp) operation explained earlier with reference to FIG. 15.

In the key scheduling part shown in FIG. 21, bit position changing processes in which the following operation circuits:

the swap (Swap) operation circuit 411, and the i-bit sub-swap (SubSwap) operation circuit 412 are applied are alternately executed to generate individual round keys.

A round-key generation sequence of the key scheduling part shown in FIG. 21 will be explained. A k-bit secret key K to be input to the key scheduling part is input to the non-linear transformation circuit 401, and a non-linear transformation process is performed to generate n-bit intermediate-key data L. The intermediate-key data L is stored in the register RegL 403 through the selector 402. In the data first stored in the register RegL 403, n/2 bits, for example, the upper half n/2 bits, are output as the round key for the first round.

Further, this data stored in the register RegL 403 is subjected to a bit position changing process by the swap (Swap) operation circuit 411, that is, a swap (Swap) process serving as the bit position changing process explained earlier with reference to FIG. 22. The result of the process is input to the register RegL 403. In this input data, n/2 bits, for example, the upper half n/2 bits, are output as the next round key.

Further, this data stored in the register RegL 403 is subjected to a bit position changing process by the sub-swap (SubSwap) operation circuit 412, that is, a sub-swap (Sub-Swap) process serving as the bit position changing process explained earlier with reference to FIG. 23. The result of the process is input to the register RegL 403. In this input data, n/2 bits, for example, the upper half n/2 bits, are output as the next round key.

In the following, bit position changing processes in which the following operation circuits:

the swap (Swap) operation circuit 411, and the i-bit sub-swap (SubSwap) operation circuit 412 are applied are alternately executed to generate individual round keys. In this manner, round keys $RK_1, RK_2, \ldots, RK_{r-1}$, and $RK_r$ to be applied in individual round functions are generated. The data finally stored in the register RegL 403 is subjected to a bit position changing process by the jump ($Jump_{r-1}$) operation circuit 413 to execute a process of recovering the intermediate-key data L initially stored in the register RegL 403.

Figure 24:
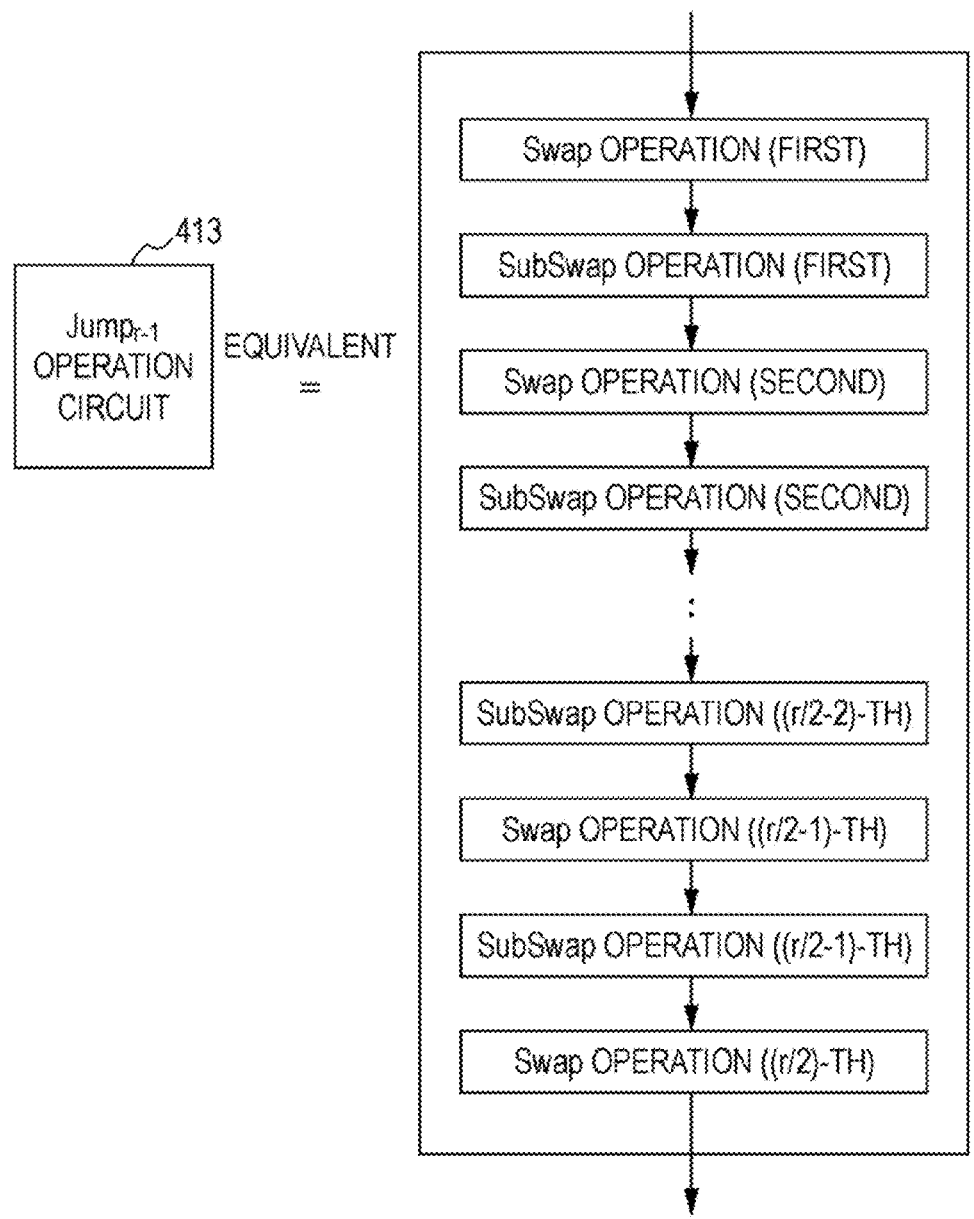
FIG. 24 is a diagram explaining a bit position changing process with the jump operation applied.

The bit position changing process performed by the jump ($Jump_{r-1}$) operation circuit 413 will be explained with reference to FIG. 24. As shown in FIG. 24, the bit position changing process performed by the jump ($Jump_{r-1}$) operation circuit 413 corresponds to a bit position changing process serving as an operation of returning a result obtained by alternately repeating swap (Swap) operations, the number of which is equal to (r/2), which are performed by the swap (Swap) operation circuit 411, and i-bit sub-swap (SubSwap) operations, the number of which is equal to (r/2−1), which are performed by the i-bit sub-swap (SubSwap) operation circuit 412 to initial data. As explained earlier, each of the swap (Swap) operation and the sub-swap (SubSwap) operation is an inverse transformation itself. Consequently, as shown in FIG. 24, the bit position changing process performed by the jump ($Jump_{r-1}$) operation circuit 413 corresponds to executing again the process of alternately repeating (r/2) swap (Swap) operations performed by the swap (Swap) operation circuit 411, and (r/2−1) i-bit sub-swap (SubSwap) operations performed by the i-bit sub-swap (SubSwap) operation circuit 412.

This Jump operation performed by the jump ($Jump_{r-1}$) operation circuit 413 ensures that the data finally stored in the register RegL 403 is returned to the value of the intermediate-key data L, which is the initial data before the swap operations and the sub-swap operations are executed.

Note that the operation circuits shown in FIG. 21, that is, the following operation circuits:

the swap (Swap) operation circuit 411, the i-bit sub-swap (SubSwap) operation circuit 412, and the jump ($Jump_{r-1}$) operation circuit 413 can be implemented by bit position conversion circuits similar to those explained earlier with reference to FIGS. 16 and 17. Therefore, for example, the jump ($Jump_{r-1}$) operation circuit 413 can be realized with a circuit size substantially equal to that of the operation in which (r−1) cyclic shift operations are performed as a single operation. Note that the above bit position changing processes may be realized as a hardware configuration similar to that explained with reference to FIGS. 16 and 17 or may be configured to be executed by software.

A round-key generation algorithm at the time of executing a cryptographic process in the key scheduling part shown in FIG. 21 will be explained. That is, an n/2-bit round key generation algorithm in which bit position changing processes performed by the following operation circuits:

the swap (Swap) operation circuit 411, the i-bit sub-swap (SubSwap) operation circuit 412, and the jump ($Jump_{r-1}$) operation circuit 413 are applied is given as below. Note that the number of rounds is an even-number round and is represented by r=r.

```
For i=1 to r−1 do
    RK_i ← upper n/2 bits of RegL
    IF i==odd
        Swap_n(RegL)
    IF i==even
        SubSwap_{n,i}(RegL)
RK_r ← upper n/2 bits of RegL
RegL ← Jump_{r−1}(RegL)
```

Further, a round-key generation algorithm for executing a decryption process by applying the key scheduling part shown in FIG. 21 is given as follows:

```
RegL ← Jump_{r−1}(RegL)
For i=r to 2 do
    RKi ← upper n/2 bits of RegL
    IF i==even
        Swap_n(RegL)
    IF i==odd
        SubSwap_{n,i}(RegL)
RK_1 ← upper n/2 bits of RegL
```

In the decryption process, first, the Jump operation performed by the jump (Jump$_{r-1}$) operation circuit 413 is executed. With this process, data including the round key data applied in the final round in the cryptographic process is set in the register RegL 403. In the configuration, thereafter, similarly to the cryptographic process, bit position changing processes performed by the following operation circuits:

the swap (Swap) operation circuit 411, and the i-bit sub-swap (SubSwap) operation circuit 412 are alternately executed to execute the generation of the round keys for the individual rounds.

As described above, with the configuration shown in FIG. 21, in both encryption/decryption, intermediate-key data L is generated, and bit position changing processes are performed on the data stored in the register RegL 403 by the following operation circuits:

the swap (Swap) operation circuit 411 the i-bit sub-swap (SubSwap) operation circuit 412 the jump (Jump$_{r-1}$) operation circuit 413

Accordingly, round keys can be generated. With this implementation, a selection circuit (the selector 241 shown in FIG. 13), which is necessary for circular shift circuits, can be omitted. In addition, four operation circuits, which are necessary for circular shift circuits, can be reduced to three operation circuits. The implementation cost and the implementation area can be reduced.

(2-5) With Regard to Round-Key Generation Process Configuration According to Third Exemplary Embodiment of Present Invention Next, a round-key generation process configuration according to a third exemplary embodiment of the present invention will be explained with reference to FIG. 25. The exemplary embodiment which will be explained hereinafter is configured such that round-key data generated using the configuration explained earlier is exclusive-ORed (EXORed) with a constant C$_j$ which is different for each round, a result of which is used as a round key. This configuration provides non-identical round keys in a case where an intermediate key is all zeros or all ones, and provides sufficient resistance to slide attacks.

The above effects are achieved.

Figure 25:
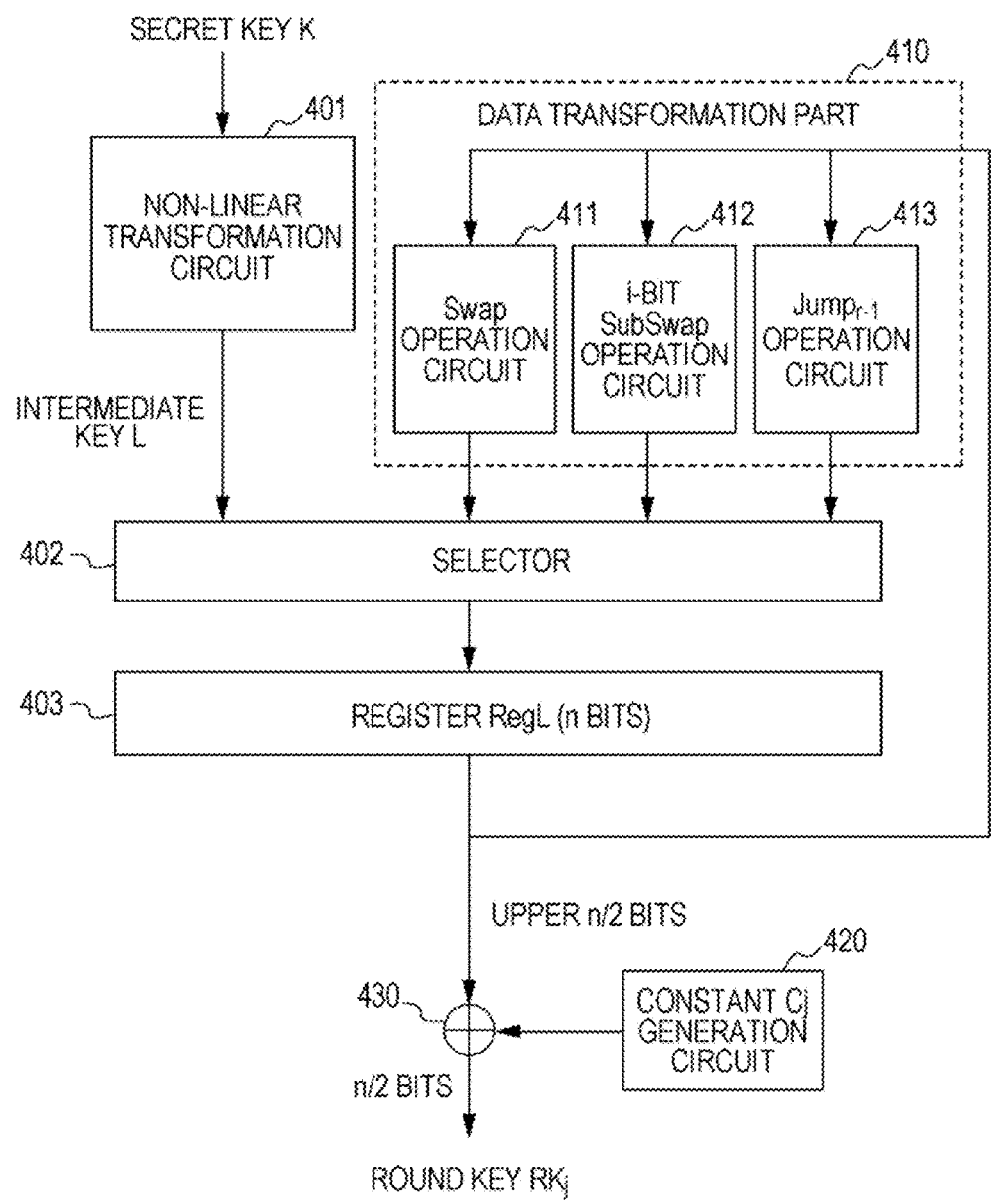
FIG. 25 is a diagram explaining an example configuration of a key scheduling part having a constant generation circuit and an exclusive-OR operation part for executing a round-key generation process.

FIG. 25 shows an example configuration of a key scheduling part of the present exemplary embodiment. The example configuration of the key scheduling part shown in FIG. 25 is a configuration in which a constant generation circuit 420 and an exclusive-OR operation part 430 are added to the configuration of the key scheduling part explained earlier with reference to FIG. 21. Note that, herein, an example that is based on the configuration of the key scheduling part shown in FIG. 25 will be explained. However, a configuration can also be realized in which the constant generation circuit 420 and the exclusive-OR operation part are added to the configuration having the double-swap operation and inverse operation circuits, which has been explained earlier with reference to FIG. 14, 15, or 21. The configuration achieves effects similar to those described above. Herein, as a typical example, an example configuration in which the constant generation circuit 420 and the exclusive-OR operation part 430 are added to the configuration of the key scheduling part explained with reference to FIG. 19 will be explained.

The configuration shown in FIG. 25 is a configuration in which the constant generation circuit 420 that generates a constant C$_j$ (1≤j≤r) which is different for each round (j), and the exclusive-OR (EXOR) operation part 430 that executes an exclusive-OR operation (EXOR) between the constant C$_j$ (1≤j≤r) for each round, which has been generated using the constant generation circuit 421, and data in a register RegL 403 for each round are added. In this exemplary embodiment, the results of this operation performed by the exclusive-OR (EXOR) operation part 430 are output as round keys {RK$_1$, RK$_2$, . . . , RK$_{r-1}$, RK$_r$}

This configuration has the effect that, for example, even in a case where all bits of the data stored in the register RegL 403 become zeros, the finally output round keys {RK$_1$, RK$_2$, . . . , RK$_{r-1}$, RK$_r$} do not become the same data.

In the configuration shown in FIG. 25, the output round keys have n/2 bits. The exclusive-OR (EXOR) operation part 430 executes exclusive-OR (EXOR) operations between, for example, the upper n/2 bits of the n-bit data stored in the register RegL 403 and the n-bit data that is generated by the constant generation circuit 420 and that is different from round to round. The results of this operation are output as round keys.

In this case, the constants that are generated by the constant generation circuit 420 and that are different from round to round are n-bit data. A circuit for generating r n-bit random constants in accordance with the number of rounds r has a problem in that the circuit size thereof also increases if the number of bits n increases. A configuration for solving such a problem and realizing a reduction in the circuit size of the constant generation circuit 420 will be explained.

Figure 26:
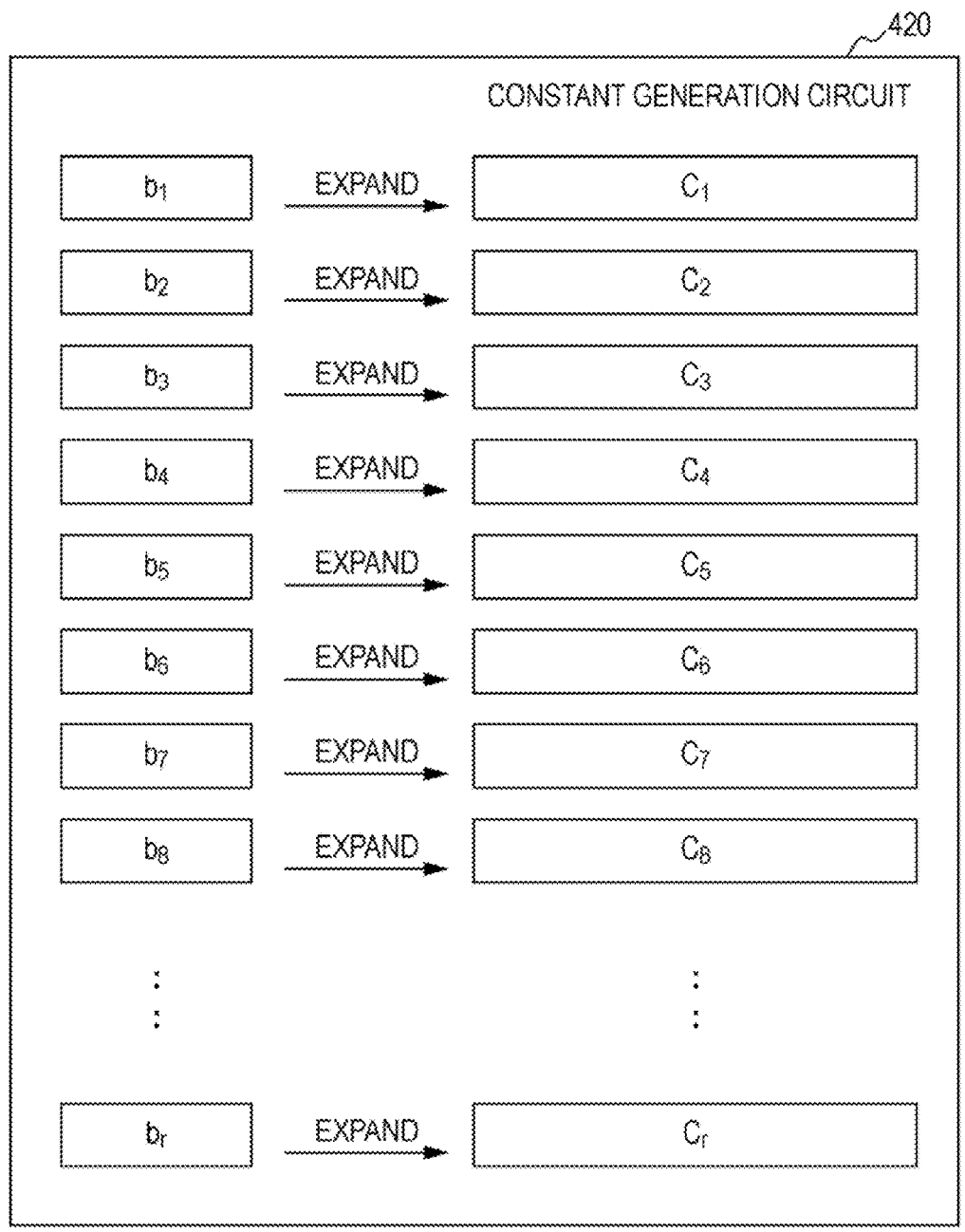
FIG. 26 is a diagram explaining an example configuration of the constant generation circuit.

For example, as shown in FIG. 26, the constant generation circuit 420 is configured to divide n-bit data into data segments b$_j$ of m bits (m<n), which are different from round to round, and to repeatedly use b$_j$ n/m times in order to reduce the circuit size. For example, in a case where n=64, the constant generation circuit 420 is intended to generate a constant C$_j$ of n=64 bits which is different for each round.

The constant generation circuit 420 executes, for example, the operation below by applying a 16-bit data segment b$_j$ which is different for each round(j), where m=16, to generate a 64-bit constant Cj, which is different for each round, and outputs the constant Cj to the exclusive-OR (EXOR) operation part 430:

$$Cj=((b_j\lll i)[EXOR](Mask_1),(b_j\lll j)[EXOR](Mask_2),(b_j\lll k)[EXOR](Mask_3),(b_j\lll 1)[EXOR](Mask_4))$$

In the above equation, b$_j$<<<i is data obtained by shifting the 16-bit data segment b$_j$ to the left by i bit or bits.

Mask$_1$ is the mask value (16 bits) serving as a preset fixed value.

(b$_j$<<<i)[EXOR](Mask1) denotes an exclusive-OR operation between (b$_j$<<<i) and (Mask1).

i, j, k, and l are each predetermined shift amounts, and

MASK$_1$, MASK$_2$, MASK$_3$, and MASK$_4$ are each predetermined mask values (16 bits).

That is, the above equation is an equation for generating a 64-bit constant C$_j$ which is different for each round by executing an exclusive-OR operation by applying the different mask value Mask$_1$, Mask$_2$, Mask$_3$, or Mask$_4$ to 16-bit data obtained by shifting a 16-bit data segment $b_j$ by the different shift amounts i, j, k, and l and arranging the resulting four 16-bitt data items.

In this manner, the constant generation circuit 420 is configured to divide data of n bits into data segments $b_j$ of m bits (m<n), which are different from round to round, and repeatedly use $b_j$ n/m times. Accordingly, the circuit size can be reduced.

Further, for example, in a case where the key scheduling part shown in FIG. 25 is configured to generate and output round keys having different key lengths corresponding to a plurality of different cryptographic processes, it is also necessary for the constant generation circuit 420 to generate and output data having bit lengths corresponding to the output key lengths. In this case, constants generated by the constant generation circuit 420 are changed in accordance with the key lengths so that, for example, the round keys can be made to have different values even in a case where the values L stored in the register RegL 403 for the different key lengths become identical.

For example, in the case of a configuration that supports all the following key lengths:
 (a) a key length of $k_1$ bits with the number of rounds $r_1$,
 (b) a key length of $k_2$ bits with the number of rounds $r_2$, and
 (c) a key length of $k_3$ bits with the number of rounds $r_3$, the constant generation circuit 420 applies in individual rounds a total number of rounds, $r_1+r_2+r_3$, different m-bit data segments $b_j$ corresponding to a plurality of different cryptographic processes. With this configuration, even in a case where the values L stored in the register RegL 403 for different key lengths become identical, round keys can also be made to have different values.

Note that if $b_j$ is a random value in accordance with the round, the size of a circuit for recording $b_j$ increases. A configuration may be employed in which m-bit data segments $b_j$, a number of which is smaller than a total number of rounds, $r_1+r_2+r_3$, corresponding to a plurality of different cryptographic processes, are set and in which the application order is changed in a case where the data segments $b_j$ are applied to the different cryptographic processes.

Alternatively, a configuration may be employed in which an m-bit constant $b_j$ is updated for each round from a certain initial value using a certain rule. For example, a rule for generating values which are different from round to round from an initial value by applying an x times multiplication operation over an extension field $GF(2^m)$ which is generated by an m-th order irreducible polynomial f(x) defined over the Galois field GF(2) can be applied. In a case where the irreducible polynomial f(x) is a primitive polynomial, the value of x times multiplication operation, which is generated from a certain initial value, has a cycle of $2^m-1$. Thus, it is possible to generate ($2^m-1$) different data items. Additionally, the above rule may be set for $x^{-1}$ times multiplication operation over an extension field $GF(2^m)$ or the like.

As shown in FIG. 25, the configuration in which an exclusive-OR (EXOR) operation between data stored in the register RegL 403 and data generated by the constant generation circuit 420, which is different from round to round, is executed, a result of which is output as a round key. This
 provides non-identical round keys in a case where an intermediate key is all zeros or all ones, and
 eliminates the relevance of individual round keys and provides sufficient resistance to slide attacks.

The above effects are achieved.

[3. Example Configuration of Cryptographic Processing Apparatus]

Figure 27:
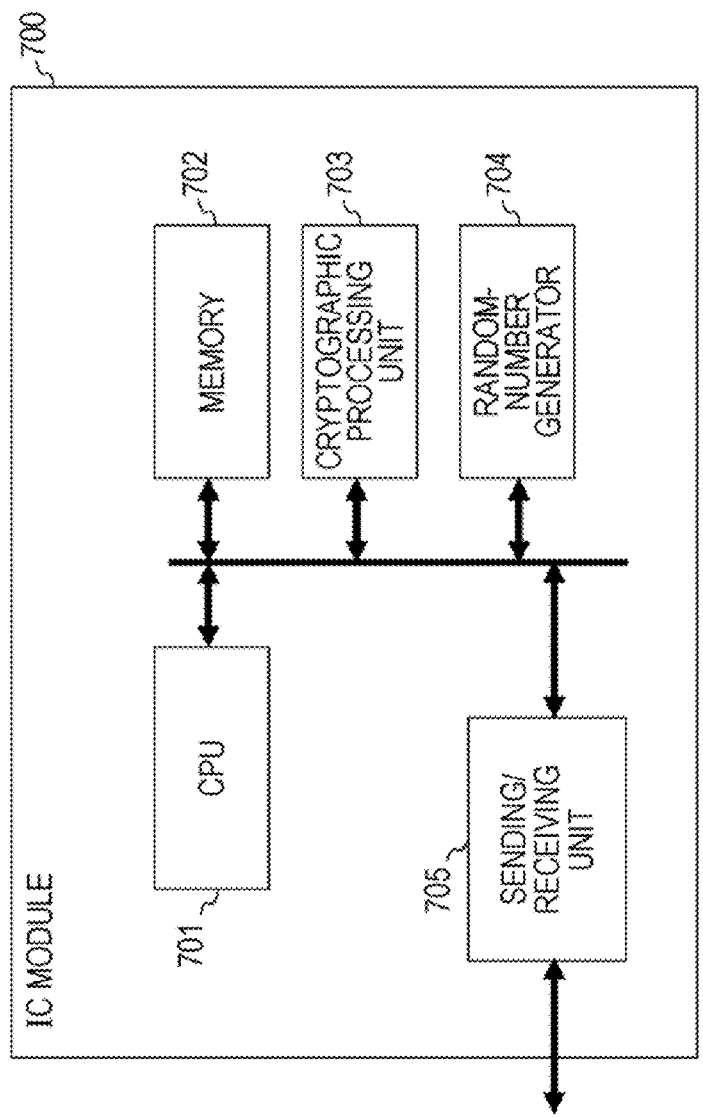
FIG. 27 is a diagram showing an example configuration of an IC module serving as a cryptographic processing apparatus for executing a cryptographic process according to the present invention.

Finally, FIG. 27 shows an example configuration of an IC module 700 serving as a cryptographic processing apparatus for executing a cryptographic process according to the exemplary embodiments described above. The processes described above can be executed using, for example, a PC, an IC card, a reader/writer, or other various information processing apparatuses. The IC module 700 shown in FIG. 27 can be configured in such various apparatuses.

A CPU (Central processing Unit) 701 shown in FIG. 27 is a processor for executing the start or termination of a cryptographic process, the control of sending and receiving data, the control of data transfer between the individual constituent parts, and other various programs. A memory 702 is composed of a ROM (Read-Only-Memory) for storing the programs executed by the CPU 701 or fixed data such as operation parameters, a RAM (Random Access Memory) used as a storage area for storing the programs executed in the process of the CPU 701 and parameters changed as necessary in the program processing or as a work region, and the like. The memory 702 can also be used as a storage region for key data necessary for the cryptographic process, a transformation table (permutation table) applied in the cryptographic process, data applied in transformation matrices, and the like. Note that the data storage region is preferably configured as a memory having a tamper-resistant structure.

A cryptographic processing unit 703 executes a cryptographic process and a decryption process according to a common-key block cipher processing algorithm to which, for example, the various above-described cryptographic process configurations described above, for example, the following configurations:
 (a) SPN (Substitution Permutation Network) structure, and
 (b) Feistel structure are applied.

Further, the cryptographic processing unit 703 has a key scheduling part having a configuration corresponding to one of the configurations corresponding to the exemplary embodiments described above, that is, the following process configurations:
 (2-3) The round-key generation process according to the first exemplary embodiment of the present invention
 (2-4) The round-key generation process according to the second exemplary embodiment of the present invention
 (2-5) The round-key generation process according to the third exemplary embodiment of the present invention Note that, herein, cryptographic processing means is used as a separate module by way of example. However, such an independent cryptographic processing module may not be provided. For example, a configuration may be adopted in which a cryptographic processing program is stored in the ROM and in which the CPU 701 reads and executes the ROM-stored program.

A random-number generator 704 executes a process of generating random numbers necessary for the generation of keys or the like necessary for the cryptographic process.

A sending/receiving unit 705 is a data communication processing unit for executing data communication with an external device. For example, the sending/receiving unit 705 executes data communication with an IC module such as a reader/writer, and executes outputting of ciphertext generated in the IC module, inputting of data from an external device such as a reader/writer, or the like.

In the foregoing, the present invention has been discussed in detail with respect to specific exemplary embodiments thereof. However, it is obvious that persons skilled in the art can make modifications or alterations to the exemplary embodiments without departing from the scope of the present invention. That is, the present invention has been disclosed in the form of illustrative examples and is not to be construed in a limited sense. The claims should be referenced to determine the scope of the present invention.

Note that the series of processes explained in the specification can be executed by hardware or software, or a combined configuration thereof. In a case where the processes are executed by software, a program on which a processing sequence is recorded can be installed into an internal memory of a computer incorporated in dedicated hardware and executed. Alternatively, the program can be installed onto a general-purpose computer capable of executing various processes and executed.

For example, the program can be recorded in advance on a hard disk or a ROM (Read Only Memory) serving as a recording medium. Alternatively, the program can be temporarily or permanently stored (recorded) in a removable recording medium such as a flexible disk, a CD-ROM (Compact Disc Read Only Memory), an MO (Magneto optical) disk, a DVD (Digital Versatile Disc), a magnetic disk, or a semiconductor memory. Such removable recording media can be provided as so-called packaged software.

Note that the program can be installed onto a computer from removable recording media as described above, or wirelessly transferred to the computer from a download site or transferred via wire to the computer over a network such as a LAN (Local Area Network) or the Internet. The computer can receive the program transferred in this manner and can install the program into a recording medium such as a built-in hard disk.

Note that various processes described in the specification not only may be executed in a time series according to the description but also may be executed in parallel or individually in accordance with the processing performance of the apparatus that executes the processes or in accordance with need. Further, in this specification, the term system refers to a logical set configuration of apparatuses regardless of whether the individual constituent apparatuses are housed in the same housing.

INDUSTRIAL APPLICABILITY

As described above, according to the configuration of an exemplary embodiment of the present invention, in a round-key generation process in a common-key block cipher process, an intermediate key generated by using a secret key transformation process is stored in a register, and a process of swapping (permuting) data segments constituting the register-stored data is repeatedly executed to generate round keys. For example, the register-stored data is divided into four data segments so that two sets of data segments having an equal number of bits are set, and a process of swapping (permuting) the individual data segments is repeatedly executed to generate a plurality of different round keys. With this configuration, the bit array of each round key can be effectively permuted, and round keys with low relevance can be generated. A high-security cryptographic process configuration with increased difficulty of key analysis can be realized.

The invention claimed is:

1. A cryptographic processing apparatus for executing a common-key block cipher process, the cryptographic processing apparatus comprising:
    a cryptographic processing part configured to perform a data transformation process of repeating a round function for a plurality of rounds; and
    a key scheduling part configured to generate a round key to be applied in execution of the round function,
    wherein the key scheduling part is configured to include:
        an intermediate key generating part configured to generate an intermediate key by using a secret key transformation process,
        a register configured to store the generated intermediate key, and
        a data transformation part configured to execute the data transformation process on register-stored data that is stored in the register, the data transformation part being configured to execute a double-swap process of dividing the register-stored data into sets of data segments and swapping the data segments in each set to generate the round key, and thereafter repeatedly execute the double-swap process based on the round key generated in a previous iteration to generate a plurality of different round keys,
    wherein the key scheduling part is configured to further include:
        a constant generation part configured to generate a constant which is different for each round, wherein the constant generation part is configured to generate small-number-of-bits data which is different for each round by performing a data transformation on small-number-of-bits data having a smaller number of bits than a constant to be generated, and generate the constant which is different for each round by using a combination of shifted data items of the generated small-number-of-bits data, and
        an exclusive-OR operation part configured to execute an exclusive-OR operation between the constant generated by the constant generation part and the register-stored data to generate the round key.

2. The cryptographic processing apparatus according to claim 1, wherein the data transformation part is configured to divide the register-stored data into four data segments so that two sets of data segments having an equal number of bits are set, and repeatedly execute a process of swapping the individual data segments to generate the plurality of different round keys.

3. The cryptographic processing apparatus according to claim 1, wherein the data transformation part is configured to:
    divide the register-stored data, the register-stored data being composed of 2m bits, into four data segments which are indicated by (a) to (d):
    (a) a data segment A0 having a top i bit,
    (b) a data segment A1 having bits in a range from an (i+1)-th bit from the top to an m-th bit,
    (c) a data segment A2 having bits in a range from an (m+1)-th bit from the top to a (2m−i)-th bit, and
    (d) a data segment A3 having a last i bit, and
    repeatedly execute a process of swapping the individual data segments to generate the plurality of different round keys.

4. The cryptographic processing apparatus according to claim 1, wherein the data transformation part includes
    a double-swap process executing part configured to divide the register-stored data into four data segments so that two sets of data segments having an equal number of bits are set, and execute a process of swapping data segments in each set, and
    a double-swap inverse process executing part configured to execute a data transformation process corresponding to an inverse process of a plurality of iteration processes of the process of the double-swap executing part.

5. The cryptographic processing apparatus according to claim 1, wherein the data transformation part:
    has a configuration for performing a decryption round-key generation process for generating the round keys in an order opposite to that of the generation of the round keys in an encryption process, and includes:

a decryption round-key-correspondence-data transformation part configured to generate result data by using a transformation process for the register-stored data, the result data being obtained as a result of repeating a double-swap process a number of times that is determined based on a predefined number of rounds, the double-swap process including dividing the register-stored data into four data segments so that two sets of data segments having an equal number of bits are set and execute a process of swapping data segments in each set, and a double-swap inverse process executing part configured to execute an inverse process of the double-swap process on data transformed in the decryption round-key-correspondence-data transformation part to generate a round key for each round.

6. The cryptographic processing apparatus according to claim 1, wherein the data transformation part includes a swap process executing part configured to divide the register-stored data, the register-stored data being composed of 2m bits, into two data segments which are indicated by (a) and (b):

(a) a data segment A0 having top m bits, and
(b) a data segment A1 having last m bits, and execute a process of swapping the individual data segments, and a sub-swap process executing part configured to divide the register-stored data, the register-stored data being composed of 2m bits, into three data segments which are indicated by (c) to (e):

(c) a data segment A0 having top (m−i) bits,
(d) a data segment A1 having bits in a range from an (m−i+1)-th bit from the top to an (m+i)-th bit, and
(e) a data segment A2 having bits in a range from an (m+i+1)-th bit from the top to an end bit, and execute a process of swapping the data segments given in (c) and (d), wherein the data transformation part is configured to alternately execute the processes of the swap process executing part and the sub-swap process executing part in accordance with a progress of rounds to execute generation of round keys.

7. The cryptographic processing apparatus according to claim 6, wherein the data transformation part further includes an inverse transformation process executing part configured to execute a data transformation corresponding to an inverse process of iteration processes of the processes of the swap process executing part and the sub-swap process executing part.

8. A cryptographic processing method for executing a common-key block cipher process using a cryptographic processing apparatus, the cryptographic processing method comprising:

a round key generating step of, in a key scheduling part, generating a plurality of round keys to be applied in execution of round functions for a plurality of rounds that are executed in a cryptographic processing part; and a cryptographic processing step of, in the cryptographic processing part, performing a data transformation process of repeating for the plurality of rounds the round functions in which the round keys are applied, wherein the round key generating step is a step including:

an intermediate-key generating step of generating an intermediate key by using a secret key transformation process and storing the generated intermediate key in a register, and a data transformation step in which a data transformation part executes a double-swap process of dividing register-stored data that is stored in the register into sets of data segments and swapping the data segments in each set to generate a round key, and thereafter repeatedly executes the double-swap process based on the round key generated in a previous iteration to generate a plurality of different round keys, a constant generation step in which a constant generation part generates a constant which is different for each round, the constant generation part being configured to generate small-number-of-bits data which is different for each round by performing a data transformation on small-number-of-bits data having a smaller number of bits than the constant to be generated, and generate the constant by using a combination of shifted data items of the generated small-number-of-bits data, and an exclusive-OR operation step in which an exclusive-OR operation part executes an exclusive-OR operation between the constant generated by the constant generation part and the register-stored data to generate the round key for each round.

9. The cryptographic processing method according to claim 8, wherein the data transformation step is a step of dividing the register-stored data into four data segments so that two sets of data segments having an equal number of bits are set, and repeatedly executing a process of swapping the individual data segments to generate the plurality of different round keys.

10. The cryptographic processing method according to claim 8, wherein the data transformation step is a step of:

dividing the register-stored data, the register-stored data being composed of 2m bits, into four data segments which are indicated by (a) to (d):

(a) a data segment A0 having a top i bit,
(b) a data segment A1 having bits in a range from an (i+1)-th bit from the top to an m−th bit,
(c) a data segment A2 having bits in a range from an (m+1)-th bit from the top to a (2m−i)-th bit, and
(d) a data segment A3 having a last i bit, and repeatedly executing a process of swapping the individual data segments to generate the plurality of different round keys.

11. The cryptographic processing method according to claim 8, wherein the data transformation step is a step including a double-swap process executing step of dividing the register-stored data into four data segments so that two sets of data segments having an equal number of bits are set, and executing a process of swapping data segments in each set, and a double-swap inverse process executing step of executing a data transformation process corresponding to an inverse process of a plurality of iteration processes of the process of the double-swap executing step.

12. The cryptographic processing method according to claim 8, wherein the data transformation step includes a step of performing a decryption round-key generation process for generating the round keys in an order opposite to that of the generation of the round keys in an encryption process, and is a step including:

a decryption round-key-correspondence-data transformation step of generating result data by using a transformation process for the register-stored data, the result data being obtained as a result of repeating a double-swap process a number of times that is determined based on a predefined number of rounds, the double-swap process including dividing the register-stored data into four data segments so that two sets of data segments having an equal number of bits are set and executing a process of swapping data segments in each set, and a double-swap inverse process executing step of executing an inverse process of the double-swap process on data transformed in the decryption round-key-correspondence-data transformation step to generate a round key for each round.

13. The cryptographic processing method according to claim 8, wherein the data transformation step includes:

a swap process executing step of dividing the register-stored data, the register-stored data being composed of 2m bits, into two data segments which are indicated by (a) and (b):

(a) a data segment A0 having top m bits, and (b) a data segment A1 having last m bits, and executing a process of swapping the individual data segments, and a sub-swap process executing step of dividing the register-stored data, the register-stored data being composed of 2m bits, into three data segments which are indicated by (c) to (e):

(c) a data segment A0 having top (m−i) bits, (d) a data segment A1 having bits in a range from an (m−i+1)-th bit from the top to an (m+i)-th bit, and (e) a data segment A2 having bits in a range from an (m+i+1)-th bit from the top to an end bit, and executing a process of swapping the data segments given in (c) and (d), wherein the data transformation step is a step of alternately executing the processes of the swap process executing step and the sub-swap process executing step in accordance with a progress of rounds to execute generation of round keys.

14. The cryptographic processing method according to claim 13, wherein the data transformation step further includes:

an inverse transformation process executing step of executing a data transformation corresponding to an inverse process of iteration processes of the processes of the swap process executing step and the sub-swap process executing step.

15. A non-transitory, computer-readable storage medium storing a computer program that, when executed by a cryptographic processing apparatus, causes the cryptographic processing apparatus to perform a common-key block cipher process, the process comprising:

a round key generating step of causing a key scheduling part to generate a plurality of round keys to be applied in execution of round functions for a plurality of rounds that are executed in a cryptographic processing part; and a cryptographic processing step of causing the cryptographic processing part to perform a data transformation process of repeating for the plurality of rounds the round functions in which the round keys are applied, wherein the round key generating step is a step of causing execution of:

an intermediate-key generating step of generating an intermediate key by using a secret key transformation process and storing the generated intermediate key in a register, a data transformation step in which a data transformation part causes execution of a double-swap process of dividing register-stored data that is stored in the register into sets of data segments and swapping the data segments in each set to generate a round key, and thereafter repeated execution of the double-swap process based on the round key generated in a previous iteration to generate a plurality of different round keys, a constant generation step in which a constant generation part generates a constant which is different for each round, the constant generation part being configured to generate small-number-of-bits data which is different for each round by performing a data transformation on small-number-of-bits data having a smaller number of bits than the constant to be generated, and generate the constant by using a combination of shifted data items of the generated small-number-of-bits data, and an exclusive-OR operation step in which an exclusive-OR operation part executes an exclusive-OR operation between the constant generated by the constant generation part and the register-stored data to generate the round key for each round.

* * * * *